(12) United States Patent
Akiyama

(10) Patent No.: US 8,199,970 B2
(45) Date of Patent: Jun. 12, 2012

(54) MOVING AMOUNT CALCULATION SYSTEM AND OBSTACLE DETECTION SYSTEM

(75) Inventor: Tatsuo Akiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 823 days.

(21) Appl. No.: 12/227,940

(22) PCT Filed: Jun. 6, 2007

(86) PCT No.: PCT/JP2007/061457
§ 371 (c)(1),
(2), (4) Date: Dec. 3, 2008

(87) PCT Pub. No.: WO2007/142267
PCT Pub. Date: Dec. 13, 2007

(65) Prior Publication Data
US 2009/0154770 A1    Jun. 18, 2009

(30) Foreign Application Priority Data
Jun. 6, 2006 (JP) .................... 2006-156994

(51) Int. Cl.
*G06K 9/00* (2006.01)
*B60R 22/00* (2006.01)
(52) U.S. Cl. .................. 382/103; 382/291; 701/45
(58) Field of Classification Search .......... 382/100–107, 382/12, 123, 155, 162, 168, 173, 181, 189–190, 382/193–195, 199, 209, 224, 232, 254, 274, 382/276, 288–291, 305, 312, 322; 340/12.25; 280/735; 701/45
See application file for complete search history.

(56) References Cited

U.S. PATENT DOCUMENTS

| | | | |
|---|---|---|---|
| 6,487,303 B1 * | 11/2002 | Yamaguchi et al. | 382/103 |
| 7,663,502 B2 * | 2/2010 | Breed | 340/12.25 |
| 7,738,678 B2 * | 6/2010 | Breed et al. | 382/100 |
| 7,887,089 B2 * | 2/2011 | Breed et al. | 280/735 |
| 7,983,817 B2 * | 7/2011 | Breed | 701/45 |

FOREIGN PATENT DOCUMENTS

| | | | |
|---|---|---|---|
| JP | 63-213005 A | | 9/1988 |
| JP | 2001-187553 | * | 7/2001 |
| JP | 2004-38624 | | 2/2004 |
| JP | 2004-54684 | | 2/2004 |
| JP | 2005-25640 | | 1/2005 |

OTHER PUBLICATIONS

Stain, Gideon P., et al., "A Robust Method for Computing Vehicle Ego-motion", Proceedings of the IEEE Intelligent Vehicle Symposium, 2000, pp. 362-368, Oct. 3, 2000.
International Preliminary Report on Patentability dated Feb. 5, 2009, in International Application No. PCT/JP2007/061457.

* cited by examiner

*Primary Examiner* — Seyed Azarian
(74) *Attorney, Agent, or Firm* — McGinn Intellectual Property Law Group, PLLC

(57) ABSTRACT

An arithmetic device (400) calculates a moving amount based on an image sensed before movement and an image sensed after movement. The arithmetic device (400) generates a difference image with minimum noise using the calculated moving amount. The arithmetic device (400) removes noise from the difference image by performing image processing of the difference image. The arithmetic device (400) determines based on the size of a binarized region in a binarized difference image whether an obstacle exists. This makes it possible to accurately calculate the moving amount and accurately determine whether an obstacle exists.

35 Claims, 15 Drawing Sheets

US 8,199,970 B2

MOVING AMOUNT CALCULATION SYSTEM AND OBSTACLE DETECTION SYSTEM

TECHNICAL FIELD

This application is based upon and claims the benefit of priority from Japanese patent application No. 2006-156994, filed on Jun. 6, 2006, the disclosure of which is incorporated herein in its entirety by reference.

The present invention relates to a moving amount calculation system which calculates an accurate moving amount (to be also referred to as moving data hereinafter) based on images obtained before and after movement of a moving body and a moving amount measured by, e.g., a sensor and containing an error.

The present invention also relates to an obstacle detection system which detects an obstacle on a plane by calculating the moving amount of a moving body and generating a difference image using the moving amount.

BACKGROUND ART

An example of an obstacle detection system related to the present invention is described in reference 1 (Japanese Patent Laid-Open No. 2001-187553). FIG. 25 is a block diagram showing an example of the arrangement of an obstacle detection system related to the present invention. As shown in FIG. 25, the obstacle detection system described in reference 1 includes a vehicle 10, display (not shown), camera 20, image processing apparatus 30, steering angle sensor 40, wheel speed sensor 60, and pulse counter 50.

The obstacle detection system shown in FIG. 25 operates in the following way. During movement of the vehicle 10, the camera 20 time-serially senses the vicinity of the vehicle. At the same time, the steering angle sensor 40, wheel speed sensor 60, and pulse counter 50 measure vehicle moving data. Projective transformation to a second viewpoint is performed to obtain an image which satisfies a condition that all sensing targets contained in an image sensed at a first viewpoint exist on a plane. A difference image between the thus obtained image and an image actually sensed at the second viewpoint is generated. The generated difference image is used for obstacle detection.

The obstacle detection system shown in FIG. 25 acquires vehicle moving data from the steering angle sensor 40, wheel speed sensor 60, and pulse counter 50. Reference 2 (Gideon P. Stain, Ofer Mano, and Amnon Shashua, "Proceedings of the IEEE Intelligent Vehicle Symposium 2000", pp. 362-368, Oct. 3, 2000, USA) describes another method of acquiring vehicle moving data. The vehicle moving data acquisition method described in reference 2 will be explained.

Initial vehicle moving data is acquired, including a moving amount in the vehicle traveling direction, a rotation amount about a horizontal axis perpendicular to the vehicle traveling direction, and a rotation amount about a vertical axis. These data are acquired by time-series image sensing by a camera mounted on a vehicle and measurement using a speed meter or calculation at the preceding viewpoints.

Projective transformation to a second viewpoint is performed based on the vehicle moving data to satisfy a condition that all sensing targets contained in an image sensed at a first viewpoint exist on a plane. Based on the difference image between the thus obtained image and an image actually sensed at the second viewpoint, the probability density of actual moving data is calculated. Moving data including a moving amount in the vehicle traveling direction, a rotation amount about the horizontal axis perpendicular to the vehicle traveling direction, and a rotation amount about the vertical axis, which ensure the maximum probability, is calculated.

DISCLOSURE OF INVENTION

Problem to be Solved by the Invention

In the system described in reference 1, the steering angle sensor 40, wheel speed sensor 60, and pulse counter 50 measure the moving amount of a moving body. The difference image between an image actually sensed at the second viewpoint and an image converted to the second viewpoint assuming that all sensing targets contained in the image sensed at the first viewpoint exist on a plane is used for obstacle detection.

However, the difference image includes moving amount errors contained in the measured values obtained from the respective sensors, and errors generated by other factors (e.g., plane distortion, camera parameter errors, calibration errors, camera vibration, sampling errors upon image sensing, and variations in the CCD element).

For this reason, the difference image generated by the system described in reference 1 contains noise (errors) generated by the above-described factors. It is therefore difficult to correctly determine based on the difference image whether an obstacle exists.

In the method described in reference 2, only the traveling direction moving amount generated by movement of the vehicle, the rotation amount about the horizontal axis perpendicular to the traveling direction, and the rotation amount about the vertical axis are estimated. It is therefore impossible to reduce, e.g., the error of moving data in the horizontal direction perpendicular to the traveling direction. Additionally, in the method described in reference 2, since a moving data error and errors caused by other factors still remain after estimation of the moving data, it is difficult to accurately detect an obstacle.

It is an object of the present invention to provide a moving amount calculation system which calculates accurate moving data using images before and after movement and moving data containing an error.

It is another object of the present invention to provide an obstacle detection system which accurately detects an obstacle using a difference image generated using the accurate moving data.

Means of Solution to the Problem

According to the present invention, there is provided a moving amount calculation system characterized by comprising a camera which is mounted on a moving body and senses an image at a first viewpoint and at a second viewpoint different from the first viewpoint as the moving body moves, a moving data measurement unit which measures a moving amount of the moving body from the first viewpoint to the second viewpoint, and an arithmetic device which updates, in accordance with the image sensed by the camera, the moving amount measured by the moving data measurement unit, the arithmetic device comprising a predicted image generation unit which generates a second viewpoint predicted image as a predicted image at the second viewpoint based on a first viewpoint image as an image sensed at the first viewpoint by the camera and the moving amount measured by the moving data measurement unit, an evaluation value calculation unit which calculates an evaluation value representing coincidence between the second viewpoint predicted image generated by the predicted image generation unit and a second viewpoint image as an image sensed at the second viewpoint by the camera, and a moving amount updating unit which updates the moving amount based on the evaluation value calculated by the evaluation value calculation unit, the moving amount including a horizontal component moving amount which is, out of the moving amount measured by the moving data measurement unit, a component on a plane of movement of the moving body in a direction perpendicular to a moving direction of the moving body that moves straight ahead.

According to the present invention, there is also provided an obstacle detection system characterized by comprising a camera which is mounted on a moving body and senses an image at a first viewpoint and at a second viewpoint different from the first viewpoint as the moving body moves, a moving data measurement unit which measures a moving amount of the moving body from the first viewpoint to the second viewpoint, and an arithmetic device which determines in accordance with the image sensed by the camera whether an obstacle exists, the arithmetic device comprising a predicted image generation unit which generates a second viewpoint predicted image as a predicted image at the second viewpoint based on a first viewpoint image as an image sensed at the first viewpoint by the camera and the moving amount measured by the moving data measurement unit, an evaluation value calculation unit which calculates a first evaluation value representing coincidence between the second viewpoint predicted image generated by the predicted image generation unit and a second viewpoint image as an image sensed at the second viewpoint by the camera, a moving amount updating unit which updates the moving amount based on the first evaluation value calculated by the evaluation value calculation unit, the moving amount including a horizontal component moving amount which is, out of the moving amount measured by the moving data measurement unit, a component on a plane of movement of the moving body in a direction perpendicular to a moving direction of the moving body that moves straight ahead, and an obstacle detection unit which determines based on the second viewpoint predicted image generated by the predicted image generation unit and the second viewpoint image sensed at the second viewpoint by the camera whether an obstacle exists.

According to the present invention, there is also provided a moving amount calculation method characterized by comprising the steps of causing a camera mounted on a moving body to sense an image at a first viewpoint and causing the camera to sense an image at a second viewpoint different from the first viewpoint after movement of the moving body, measuring a moving amount of the moving body from the first viewpoint to the second viewpoint, generating a second viewpoint predicted image as a predicted image at the second viewpoint based on the measured moving amount and a first viewpoint image as an image sensed at the first viewpoint, calculating an evaluation value representing coincidence between the second viewpoint predicted image and a second viewpoint image as an image sensed at the second viewpoint, and updating the moving amount based on the evaluation value, the moving amount including a horizontal component moving amount which is, out of the measured moving amount, a component on a plane of movement of the moving body in a direction perpendicular to a moving direction of the moving body that moves straight ahead.

According to the present invention, there is also provided an obstacle detection method characterized by comprising the steps of causing a camera mounted on a moving body to sense an image at a first viewpoint and causing the camera to sense an image at a second viewpoint different from the first viewpoint after movement of the moving body, measuring a moving amount of the moving body from the first viewpoint to the second viewpoint, generating a second viewpoint predicted image as a predicted image at the second viewpoint based on the measured moving amount and a first viewpoint image as an image sensed at the first viewpoint, calculating a first evaluation value representing coincidence between the second viewpoint predicted image and a second viewpoint image as an image sensed at the second viewpoint, updating the moving amount based on the first evaluation value, the moving amount including a horizontal component moving amount which is, out of the measured moving amount, a component on a plane of movement of the moving body in a direction perpendicular to a moving direction of the moving body that moves straight ahead, and determining based on the second viewpoint predicted image and the second viewpoint image whether an obstacle exists.

Effect of the Invention

According to the present invention, a predicted image after movement is generated based on an image sensed before movement, and a moving amount is obtained based on an evaluation value representing coincidence between the generated predicted image and the sensed image. This allows to accurately obtain the moving data of the moving body.

According to the present invention, a difference image is generated based on the accurately obtained moving data, and it is determined based on the generated difference image whether an obstacle exists. This allows to accurately detect an obstacle.

BEST MODE FOR CARRYING OUT THE INVENTION

Figure 1:
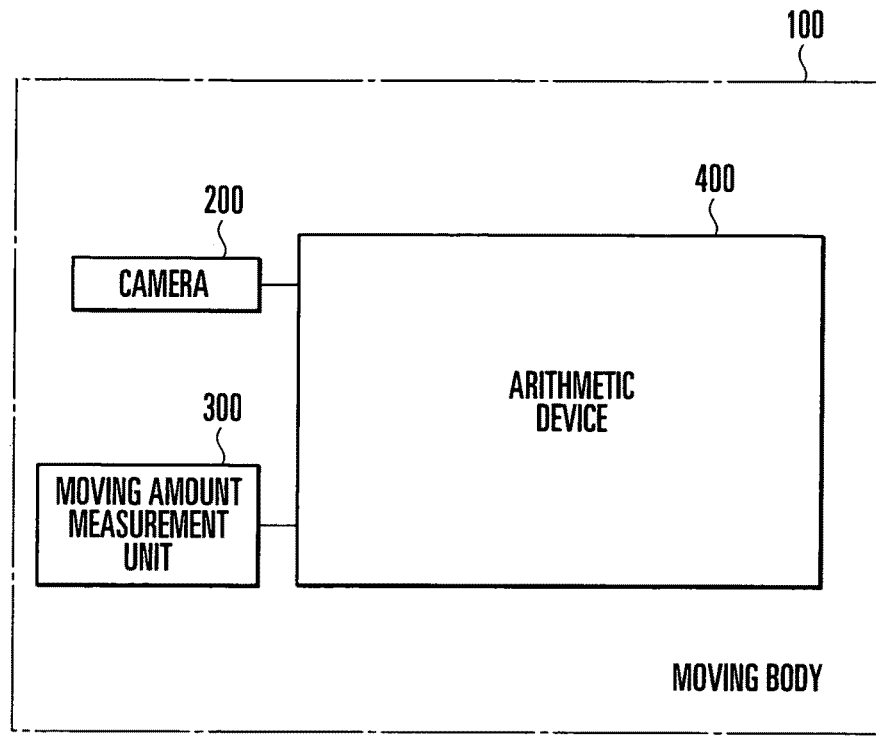
FIG. 1 is a block diagram showing an example of the arrangement of an obstacle detection system according to an exemplary embodiment.

An exemplary embodiment of the present invention will be described with reference to the accompanying drawings. FIG. 1 is a block diagram showing an example of the arrangement of an obstacle detection system according to the present invention. The obstacle detection system shown in FIG. 1 includes a camera 200, moving amount measurement unit (moving data measurement unit) 300, and arithmetic device 400. The camera 200, moving amount measurement unit 300, and arithmetic device 400 are installed on a moving body 100.

The camera 200 is a single-lens camera capable of time-serially sensing an image. The camera 200 senses images from a first viewpoint and a second viewpoint moved from the first viewpoint.

The moving amount measurement unit 300 measures a moving amount generated during movement from the first viewpoint to the second viewpoint using, e.g., a wheel speed sensor which detects the rotation speed of a wheel arranged on the moving body 100, a steering angle sensor which detects a steering angle, i.e., the angle of a wheel with respect to the straight-ahead direction of the moving body 100, and a pulse counter which counts the number of pulses output from each sensor. Data representing the moving amount generated during movement from the first viewpoint to the second viewpoint will be referred to as moving data hereinafter.

The moving data includes at least a horizontal component moving amount, depth component moving amount, and rotation amount about a vertical axis. The horizontal component moving amount is, out of the moving amount of the moving body 100 measured by the moving amount measurement unit 300, the amount of movement of the moving body 100 on the plane of movement in a direction perpendicular to the moving direction of the moving body 100 that moves straight ahead. The depth component moving amount is, out of the moving amount of the moving body 100 measured by the moving amount measurement unit 300, the amount of movement of the moving body 100 in the straight-ahead direction. The rotation amount about a vertical axis is the amount of rotation about a vertical axis that is perpendicular to the plane of movement of the moving body 100.

Upon receiving an image sensed by the camera 200 at the first viewpoint, an image sensed by the camera 200 at the second viewpoint, and initial moving data that is moving data measured by the moving amount measurement unit 300, the arithmetic device 400 determines the presence/absence of an obstacle on the plane in the image sensing direction of the camera 200 (in this specification, the traveling direction of the moving body 100).

Figure 2:
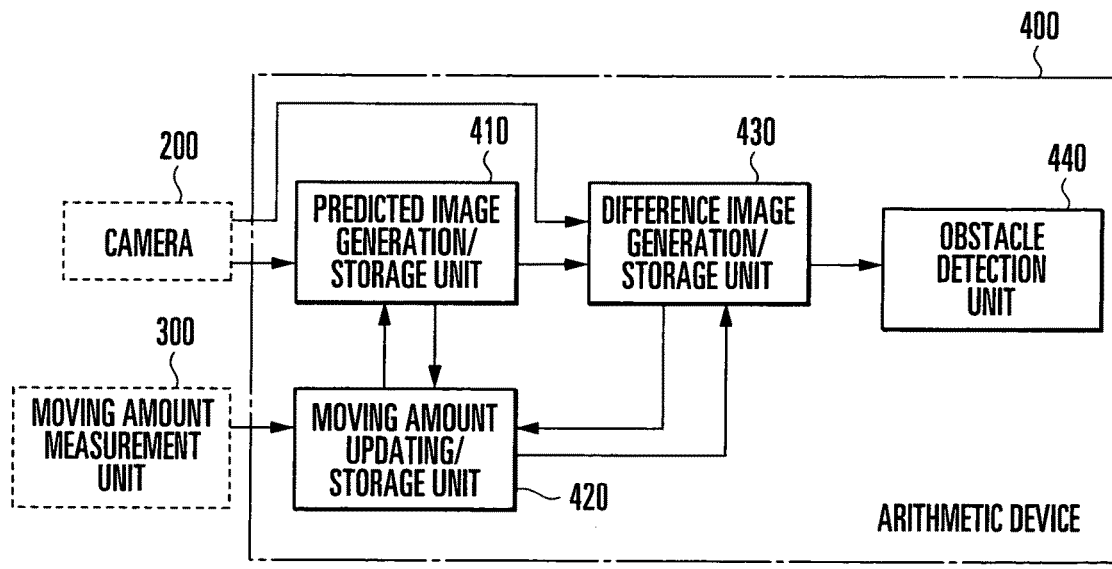
FIG. 2 is a block diagram showing an example of the arrangement of an arithmetic device.

FIG. 2 is a block diagram showing an example of the arrangement of the arithmetic device 400. The arithmetic device 400 shown in FIG. 2 includes a predicted image generation/storage unit 410, moving amount updating/storage unit 420, difference image generation/storage unit (evaluation value calculation unit) 430, and obstacle detection unit 440.

Figure 3:
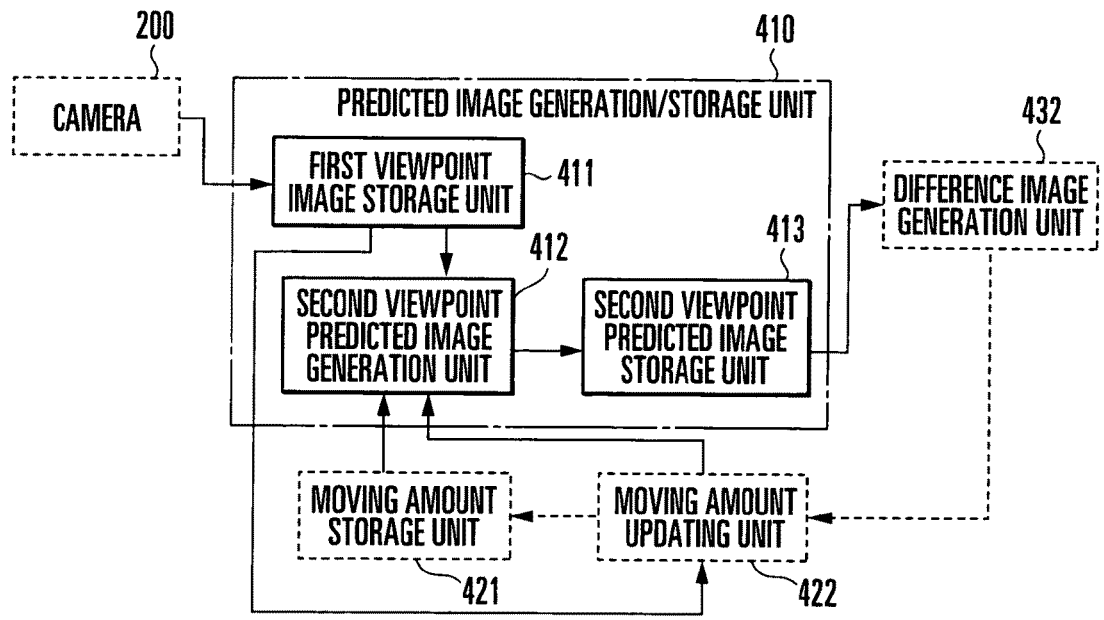
FIG. 3 is a block diagram showing an example of the arrangement of a predicted image generation/storage unit.

FIG. 3 is a block diagram showing an example of the arrangement of the predicted image generation/storage unit 410. The predicted image generation/storage unit 410 shown in FIG. 3 includes a first viewpoint image storage unit 411, second viewpoint predicted image generation unit 412, and second viewpoint predicted image storage unit 413.

The first viewpoint image storage unit 411 includes a memory for storing a first viewpoint image which is an image sensed by the camera 200 at the first viewpoint, and stores the first viewpoint image input from the camera 200.

The second viewpoint predicted image generation unit 412 has a function of calculating, based on coordinates (camera coordinates) in an image sensed by the camera 200, coordinates (world coordinates) in the real world which has the origin at a point where the position of the camera 200 is projected onto a plane along the vertical axis, assuming that all targets sensed by the camera 200 exist on a predetermined plane.

The second viewpoint predicted image generation unit 412 also has a function of calculating world coordinates at the first viewpoint based on world coordinates at the second viewpoint using initial moving data or updated moving data. The second viewpoint predicted image generation unit 412 also has a function of calculating camera coordinates based on world coordinates, assuming that all targets sensed by the camera 200 exist on a predetermined plane.

Using the above-described functions, the second viewpoint predicted image generation unit 412 generates a second viewpoint predicted image in a predetermined region using the first viewpoint image stored in the memory of the first viewpoint image storage unit 411 and initial moving data stored in the memory of a moving amount storage unit 421 and/or updated moving data output from a moving amount updating unit 422. The moving amount updating unit 422 and updated moving data will be described later.

The second viewpoint predicted image storage unit 413 includes a memory for storing a second viewpoint predicted image, and stores a second viewpoint predicted image generated by the second viewpoint predicted image generation unit 412.

Figure 4:
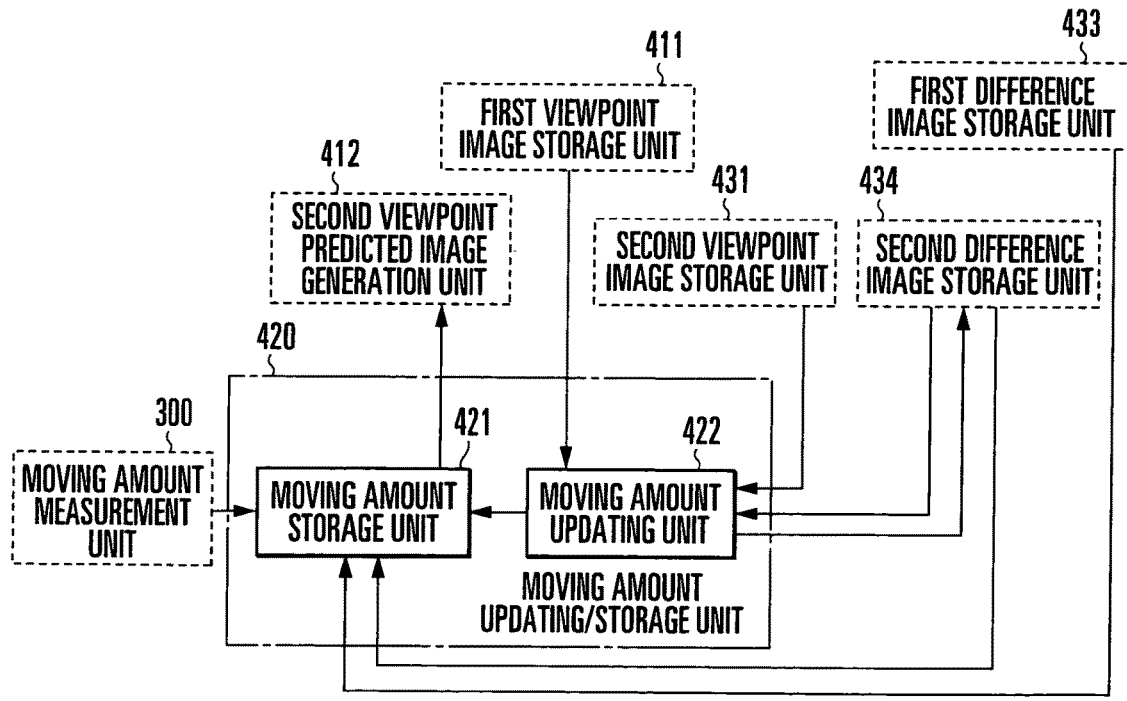
FIG. 4 is a block diagram showing an example of the arrangement of a moving amount updating/storage unit.

FIG. 4 is a block diagram showing an example of the arrangement of the moving amount updating/storage unit 420. The moving amount updating/storage unit 420 shown in FIG. 4 includes the moving amount storage unit 421 and the moving amount updating unit 422.

The moving amount storage unit 421 includes a memory for storing initial moving data or updated moving data. When the moving amount updating unit 422 updates moving data, the moving amount storage unit 421 stores the updated moving data.

The moving amount updating unit 422 calculates updated moving data based on the first viewpoint image stored in the memory of the first viewpoint image storage unit 411, a second viewpoint image stored in the memory of a second viewpoint image storage unit 431, and a difference image stored in the memory of a second difference image storage unit 434, and outputs the calculated updated moving data to the second viewpoint predicted image generation unit 412. If predetermined conditions are satisfied, the moving amount updating unit 422 updates initial moving data or updated moving data.

Figure 5:
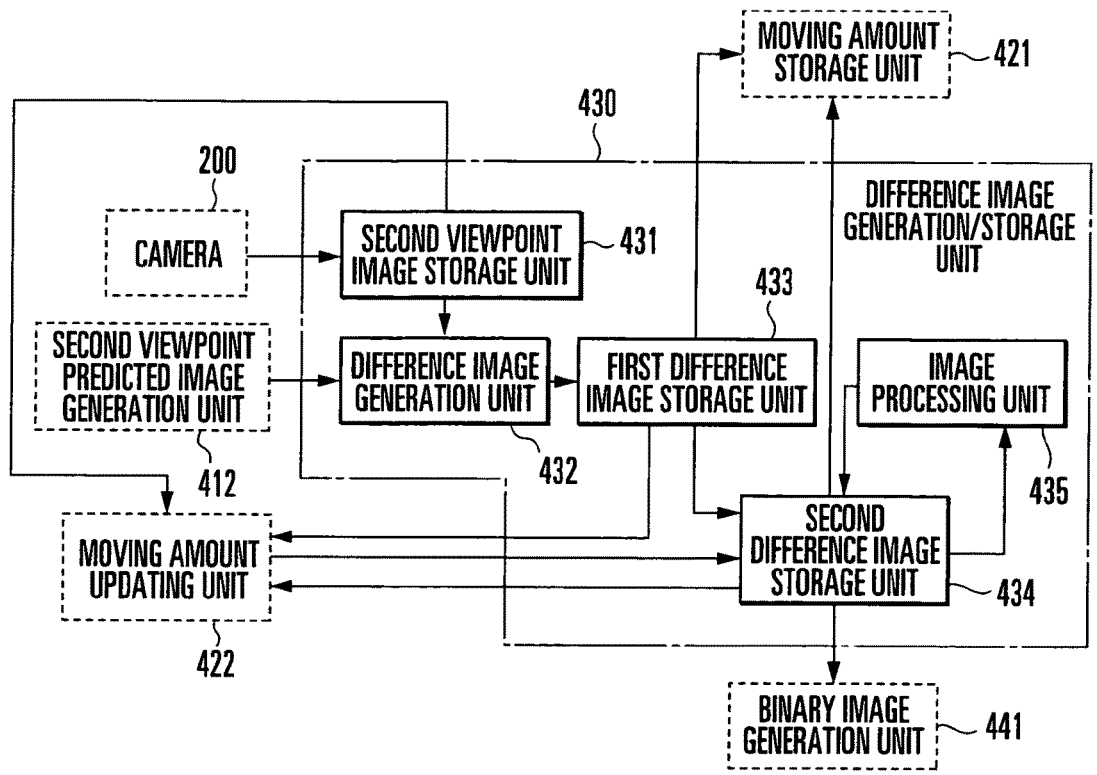
FIG. 5 is a block diagram showing an example of the arrangement of a difference image generation/storage unit.

FIG. 5 is a block diagram showing an example of the arrangement of the difference image generation/storage unit 430. The difference image generation/storage unit 430 shown in FIG. 5 includes the second viewpoint image storage unit 431, a difference image generation unit 432, a first difference image storage unit 433, the second difference image storage unit 434, and an image processing unit 435.

The second viewpoint image storage unit 431 includes a memory for storing a second viewpoint image which is an image sensed by the camera 200 at the second viewpoint.

The difference image generation unit 432 generates a difference image between the second viewpoint predicted image stored in the memory of the second viewpoint predicted image storage unit 413 and the second viewpoint image stored in the memory of the second viewpoint image storage unit 431 and calculates an evaluation value (first evaluation value). The evaluation value preferably represents the coincidence between the second viewpoint image and the second viewpoint predicted image. For example, the sum of all pixel values in a predetermined range of the difference image, or a value obtained by dividing the sum by the number of pixels present in the predetermined range is usable.

The first difference image storage unit 433 includes a memory for storing a difference image and an evaluation value and stores the difference image and the evaluation value generated by the difference image generation unit 432.

The second difference image storage unit 434 includes a memory for storing a difference image and an evaluation value and stores the difference image and the evaluation value stored in the memory of the first difference image storage unit 433. When the image processing unit 435 performs image processing, the second difference image storage unit 434 stores the image processing result.

The image processing unit 435 performs image processing of the difference image stored in the memory of the second difference image storage unit 434. The image processing unit 435 executes image processing aiming at erasing regions in the difference image, which should not be generated theoretically but are formed due to various errors. For example, processing such as minimum value filtering, morphological operation, or image reduction is performed a predetermined number of times.

Figure 6:
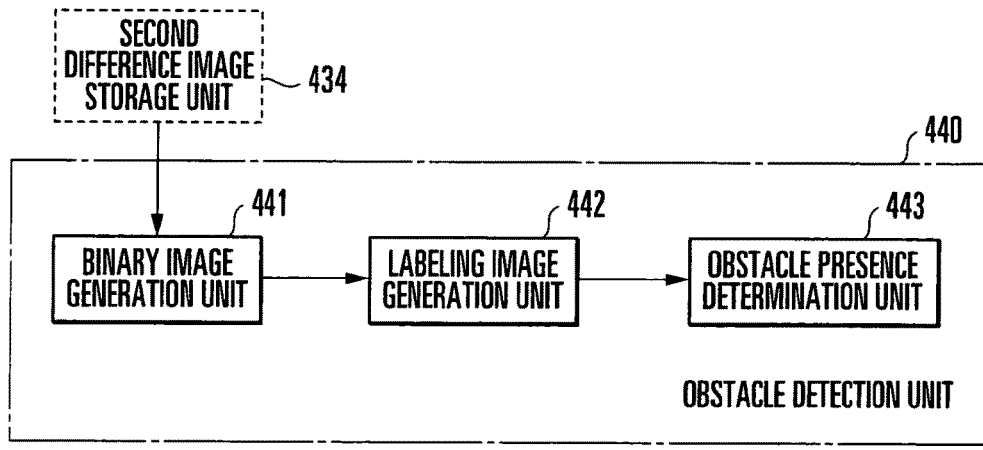
FIG. 6 is a block diagram showing an example of the arrangement of an obstacle detection unit.

FIG. 6 is a block diagram showing an example of the arrangement of the obstacle detection unit 440. The obstacle detection unit 440 shown in FIG. 6 includes a binary image generation unit 441, labeling image generation unit 442, and obstacle presence determination unit 443.

The binary image generation unit 441 binarizes the difference image stored in the memory of the second difference image storage unit 434 using a predetermined method. Examples of the predetermined method are a binarization method using a predetermined threshold value and a binarization method using an appropriate binarization threshold value determined by, e.g., discriminant analysis of a pixel value distribution.

The labeling image generation unit 442 labels the binary image generated by the binary image generation unit 441. The labeling will be described later.

The obstacle presence determination unit 443 determines based on the result of labeling performed by the labeling image generation unit 442 whether an obstacle exists (obstacle presence determination). In the obstacle presence determination, if, for example, the circumscribed rectangle width or circumscribed rectangle height of a concatenated region or the number of pixels belonging to the same label in the labeled difference image calculated by the labeling image generation unit 442 satisfies a predetermined condition, it is determined that an obstacle exists.

Generally, as the circumscribed rectangle width, the circumscribed rectangle height, or the number of pixels belonging to the same label is large, the concatenated region is not regarded as noise. However, to employ the circumscribed rectangle width, the circumscribed rectangle height, or the number of pixels belonging to the same label as a condition for obstacle presence determination, an obstacle must be large enough to obtain a concatenated region having a certain size on the difference image, or large movement of the moving body is necessary. Hence, appropriate conditions need to be set.

The arithmetic device 400 incorporates a moving amount calculation program which causes a computer to execute the steps of generating a second viewpoint predicted image that is a predicted image at a second viewpoint based on a first viewpoint image that is an image sensed at a first viewpoint by the camera 200 mounted on the moving body 100, and the moving amount of the moving body from the first viewpoint to the second viewpoint, calculating an evaluation value representing the coincidence between the second viewpoint predicted image and a second viewpoint image that is an image sensed at the second viewpoint by the camera 200, and updating, based on the evaluation value, the moving amount including a horizontal component moving amount which is, out of the moving amount of the moving body 100, a component on the plane of movement of the moving body 100 in a direction perpendicular to the moving direction of the moving body 100 that moves straight ahead.

The arithmetic device 400 incorporates an obstacle detection program which causes a computer to execute the steps of generating a second viewpoint predicted image that is a predicted image at a second viewpoint based on a first viewpoint image that is an image sensed at a first viewpoint by the camera 200 mounted on the moving body 100, and the moving amount of the moving body from the first viewpoint to the second viewpoint, calculating an evaluation value representing the coincidence between the second viewpoint predicted image and a second viewpoint image that is an image sensed at the second viewpoint by the camera 200, updating, based on the evaluation value, the moving amount including a horizontal component moving amount which is, out of the moving amount of the moving body 100, a component on the plane of movement of the moving body 100 in a direction perpendicular to the moving direction of the moving body 100 that moves straight ahead, and determining based on the second viewpoint predicted image and the second viewpoint image whether an obstacle exists.

The moving amount calculation program and the obstacle detection program can be provided as programs stored in a computer-readable storage medium such as an optical disk or a magnetic disk. An arithmetic unit including the CPU of a computer operates in accordance with the programs, thereby implementing the functional units of the arithmetic device 400 shown in FIGS. 2 to 6.

Figure 7:
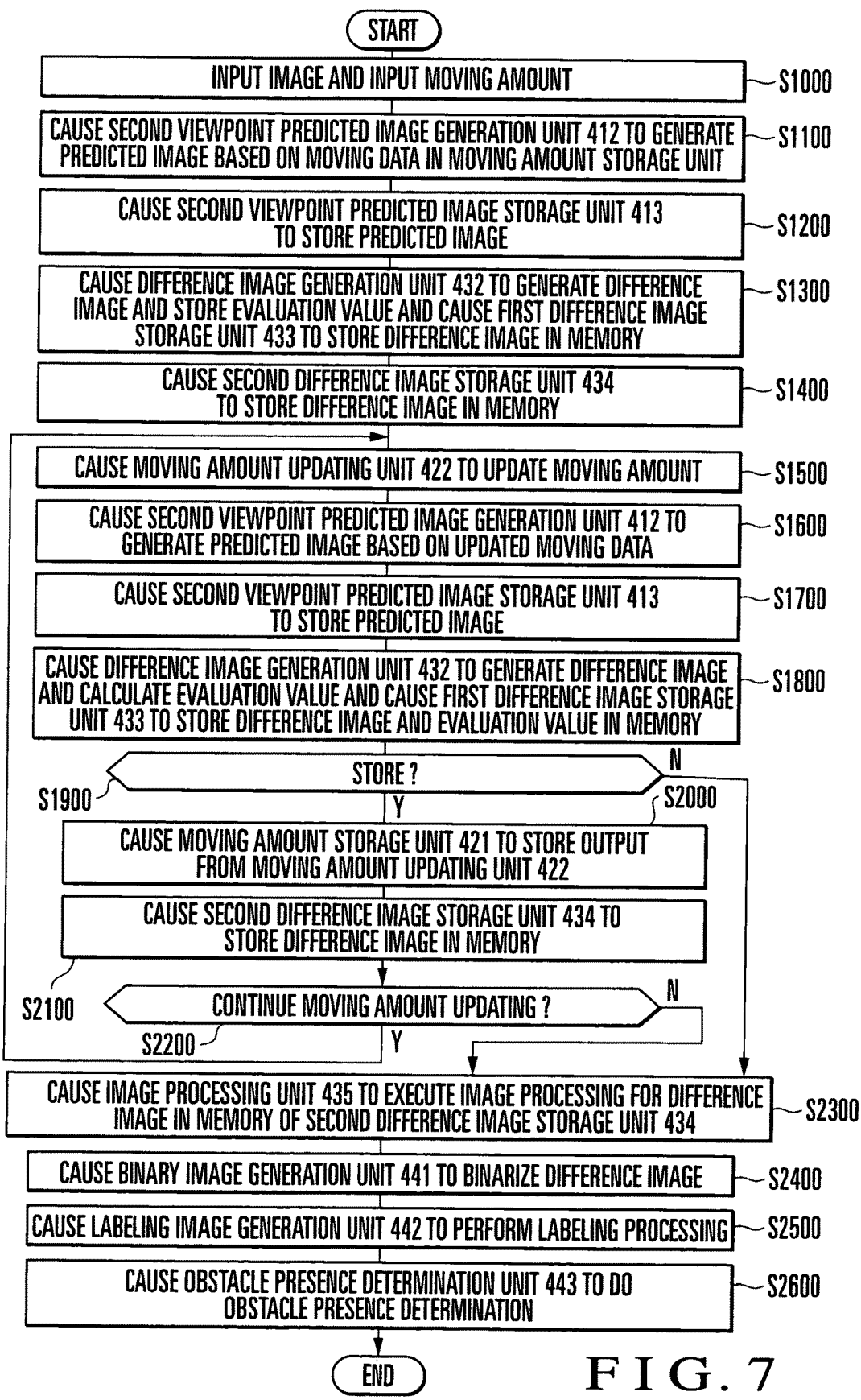
FIG. 7 is a flowchart illustrating an overall operation according to the exemplary embodiment of the present invention.

An operation according to the exemplary embodiment of the present invention will be described next with reference to the drawings. FIG. 7 is a flowchart illustrating an overall operation according to the exemplary embodiment of the present invention.

The first viewpoint image storage unit 411 stores, in the memory, a first viewpoint image sensed at a first viewpoint by the camera 200. The second viewpoint image storage unit 431 stores, in the memory, a second viewpoint image sensed at a second viewpoint by the camera 200. The moving amount storage unit 421 stores, in the memory, initial moving data measured by the moving amount measurement unit 300 (step S1000 in FIG. 7).

The second viewpoint predicted image generation unit 412 generates a second viewpoint predicted image based on the initial moving data stored in the memory of the moving amount storage unit 421 and the first viewpoint image stored in the memory of the first viewpoint image storage unit 411 (step S1100 in FIG. 7).

Figure 8:
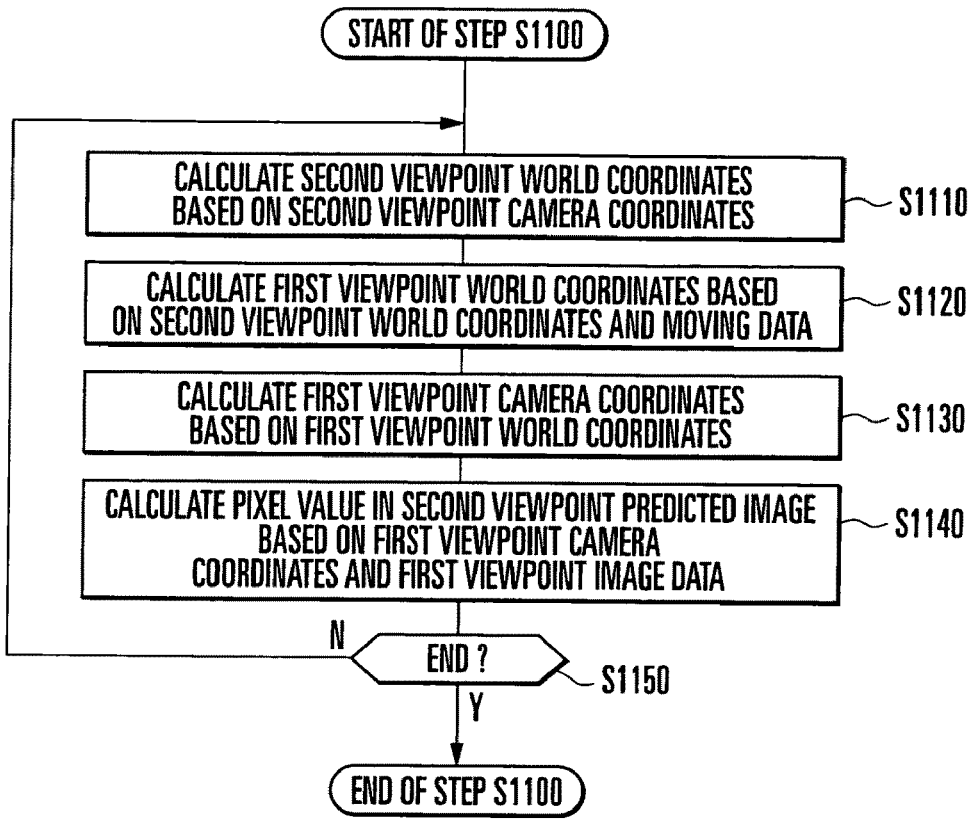
FIG. 8 is a flowchart for explaining an operation of generating a second viewpoint predicted image based on initial moving data and a first viewpoint image.

The operation of generating the second viewpoint predicted image based on the initial moving data and the first viewpoint image will be described with reference to the drawings. FIG. 8 is a flowchart for explaining the operation of generating the second viewpoint predicted image based on the initial moving data and the first viewpoint image (the operation in step S1100).

The second viewpoint predicted image generation unit 412 performs the following operation for all pixels whose pixel values are to be obtained in the second viewpoint predicted image. More specifically, the second viewpoint predicted image generation unit 412 calculates world coordinate values at the second viewpoint corresponding to the camera coordinate values of a pixel included in the second viewpoint predicted image (step S1110 in FIG. 8).

The second viewpoint predicted image generation unit 412 calculates the world coordinate values of the pixel at the first viewpoint based on the calculated world coordinate values at the second viewpoint and the initial moving data stored in the memory of the moving amount storage unit 421 (step S1120 in FIG. 8).

The second viewpoint predicted image generation unit 412 calculates the camera coordinate values of the pixel at the first viewpoint based on the calculated world coordinate values at the first viewpoint (step S1130 in FIG. 8). Additionally, the second viewpoint predicted image generation unit 412 calculates the pixel value of the pixel in the second viewpoint predicted image based on the first viewpoint image stored in the memory of the first viewpoint image storage unit 411 (step S1140 in FIG. 8).

Normally, the camera coordinate values at the first viewpoint which are obtained in step S1130 and, more particularly, the camera coordinate values at the first viewpoint corresponding to the pixel value obtained in step S1140 are not integers. Hence, the camera coordinate values at the first viewpoint obtained in step S1130 are assumed to be values (integers) interpolated by, e.g., bilinear interpolation.

If the pixel values of all pixels in the second viewpoint predicted image are calculated (Y in step S1150 of FIG. 8), the process advances to step S1200 in FIG. 7. Otherwise (N in step S1150 of FIG. 8), the process returns to step S1110 to calculate the pixel value of another pixel.

That is, the second viewpoint predicted image generation unit 412 calculates the pixel values of all pixels included in the second viewpoint predicted image based on the initial moving data and the first viewpoint image, thereby generating the second viewpoint predicted image.

The second viewpoint predicted image storage unit 413 stores, in its memory, the second viewpoint predicted image generated by the second viewpoint predicted image generation unit 412 (step S1200 in FIG. 7).

The difference image generation unit 432 generates a difference image between the second viewpoint image and the second viewpoint predicted image. The difference image generation unit 432 stores, in the memory of the first difference image storage unit 433, the generated difference image and an evaluation value (first evaluation value) calculated based on the difference image (step S1300 in FIG. 7).

Figure 9:
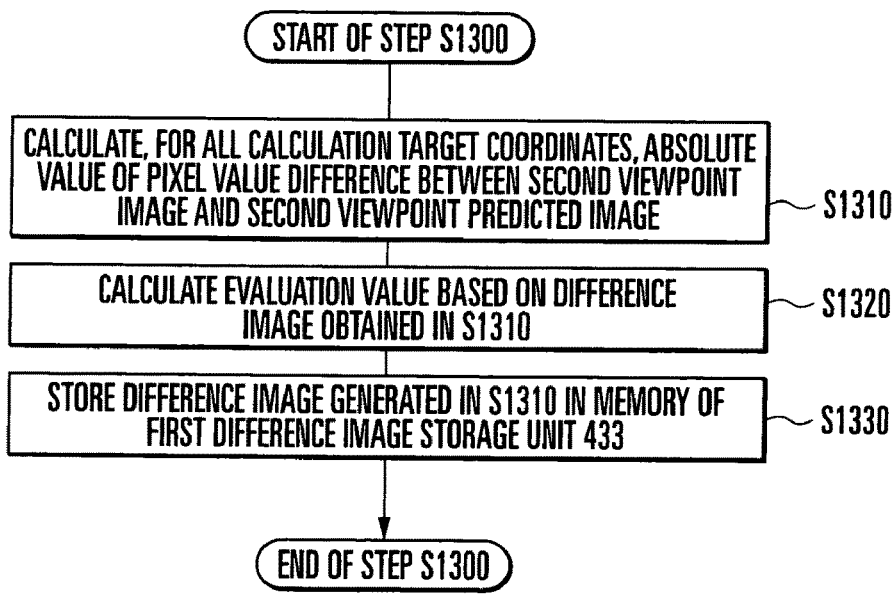
FIG. 9 is a flowchart for explaining difference image generation and evaluation value calculation.

FIG. 9 is a flowchart for explaining difference image generation and evaluation value calculation (flowchart for explaining the operation in step S1300). To generate the difference image, the difference image generation unit 432 calculates, for each pixel as an evaluation value calculation target, the absolute value of the difference between the pixel value of the pixel in the second viewpoint image and the pixel value of the pixel in the second viewpoint predicted image. The difference image generation unit 432 thus generates an image (difference image) including pixels having the calculated absolute values as pixel values (step S1310 in FIG. 9).

The difference image generation unit 432 obtains an evaluation value based on the difference image (step S1320 in FIG. 9). The evaluation value is, e.g., a value obtained by dividing the sum of the pixel values of pixels in a predetermined region of the difference image by the number of pixels in the region. The difference image generation unit 432 stores the generated difference image and the evaluation value in the memory of the first difference image storage unit 433 (step S1330 in FIG. 9).

Hence, the difference image and the evaluation value are stored in the memory of the first difference image storage unit 433.

The difference image and the evaluation value, which are stored in the memory of the first difference image storage unit 433, are stored in the memory of the second difference image storage unit 434 (step S1400 in FIG. 7).

The moving amount updating unit 422 calculates updated moving data based on the initial moving data stored in the memory of the moving amount storage unit 421, the first viewpoint image stored in the memory of the first viewpoint image storage unit 411, the second viewpoint image stored in the memory of the second viewpoint image storage unit 431, and the evaluation value stored in the memory of the second difference image storage unit 434 (step S1500 in FIG. 7).

Figure 10:
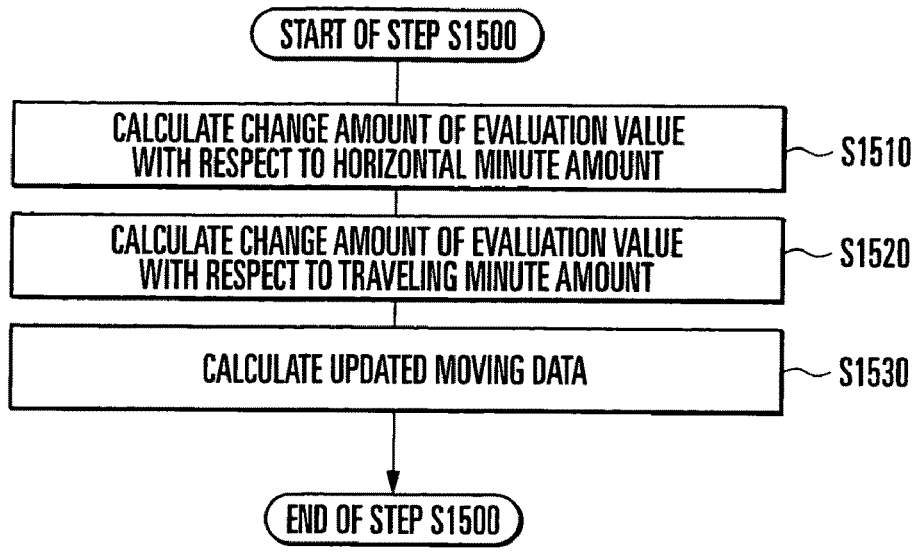
FIG. 10 is a flowchart for explaining an operation of calculating updated moving data.

FIG. 10 is a flowchart for explaining the operation of calculating updated moving data (the operation in step S1500). The moving amount updating unit 422 calculates the change amount of the evaluation value with respect to a horizontal minute amount (step S1510 in FIG. 10). Next, the moving amount updating unit 422 calculates the change amount of the evaluation value with respect to a traveling minute amount (step S1520 in FIG. 10). The moving amount updating unit 422 calculates updated moving data (step S1530 in FIG. 10).

Figure 11:
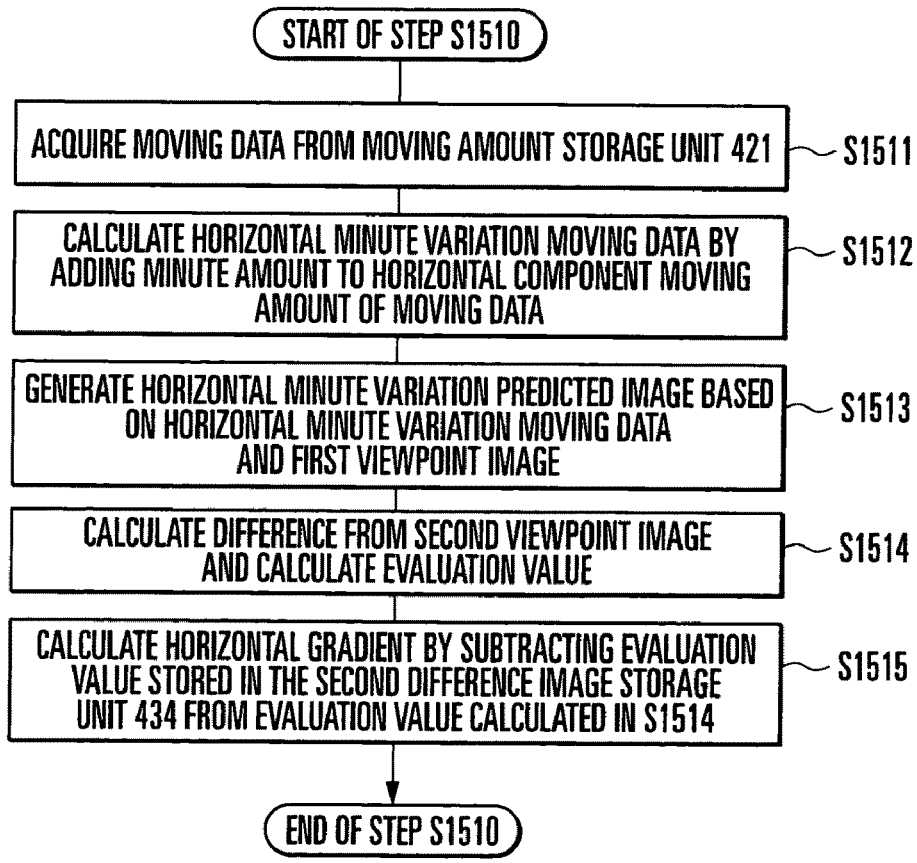
FIG. 11 is a flowchart for explaining an operation of calculating the change amount of an evaluation value with respect to a horizontal minute amount.

FIG. 11 is a flowchart for explaining the operation of calculating the change amount of the evaluation value with respect to the horizontal minute amount (the operation in step S1510). The moving amount updating unit 422 acquires moving data (initial moving data or updated moving data: in this example, initial moving data) from the memory of the moving amount storage unit 421 (step S1511 in FIG. 11).

The moving amount updating unit 422 calculates horizontal minute variation moving data by adding a predetermined positive minute amount to the horizontal component of the moving data (step S1512 in FIG. 11). The predetermined positive minute amount added to the horizontal component of the moving data is, e.g., 1.

Based on the first viewpoint image stored in the memory of the first viewpoint image storage unit 411 and the horizontal minute variation moving data, the moving amount updating unit 422 generates a horizontal minute variation predicted image that is a predicted screen obtained upon changing the moving data by adding the minute amount to the horizontal component of the moving data (step S1513 in FIG. 11). The horizontal minute variation predicted image is generated by performing calculation in accordance with the same method as in step S1100, in which the initial moving data in step S1100 is replaced with horizontal minute variation moving data.

The moving amount updating unit 422 generates a difference image between the second viewpoint image stored in the memory of the second viewpoint image storage unit 431 and the horizontal minute variation predicted image generated in step S1513 and calculates an evaluation value (second evaluation value) (step S1514 in FIG. 11). The difference image generation and evaluation value calculation are done using the same method as in step S1300 in which the second viewpoint predicted image in step S1300 is replaced with the horizontal minute variation predicted image.

The moving amount updating unit 422 calculates a horizontal gradient amount by subtracting the evaluation value stored in the memory of the second difference image storage unit 434 from the evaluation value calculated in step S1514 (step S1515 in FIG. 11).

Figure 12:
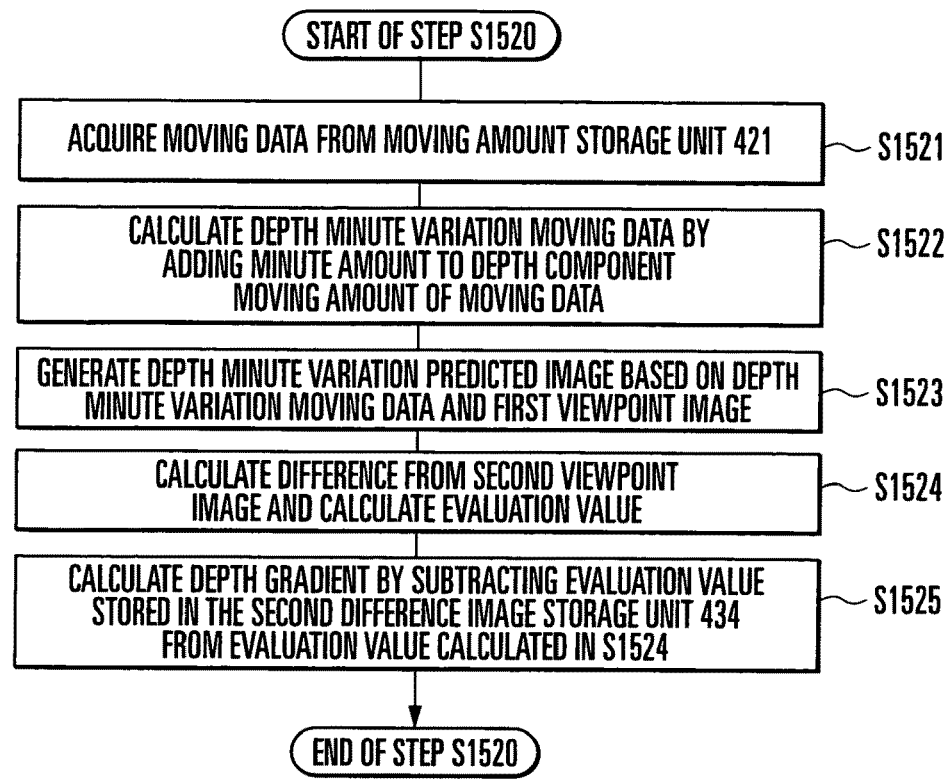
FIG. 12 is a flowchart for explaining an operation of calculating the change amount of an evaluation value with respect to a depth minute amount.

FIG. 12 is a flowchart for explaining the operation of causing the moving amount updating unit 422 to calculate the change amount of the evaluation value with respect to the traveling minute amount (the operation in step S1520).

The moving amount updating unit 422 acquires moving data (initial moving data or updated moving data: in this example, initial moving data) from the memory of the moving amount storage unit 421 (step S1521 in FIG. 12). The moving amount updating unit 422 calculates depth minute variation moving data by adding a predetermined positive minute amount to the component of the moving data in the depth direction (the traveling direction of the moving body 100) (step S1522 in FIG. 12). The predetermined positive minute amount added to the depth component of the moving data is, e.g., 1.

The moving amount updating unit 422 generates a depth minute variation predicted image based on the first viewpoint image stored in the memory of the first viewpoint image storage unit 411 and the depth minute variation moving data (step S1523 in FIG. 12). The depth minute variation predicted image is generated by performing calculation in accordance with the same method as in step S1100, in which the initial moving data in step S1100 is replaced with depth minute variation moving data.

The moving amount updating unit 422 generates a difference image between the second viewpoint image stored in the memory of the second viewpoint image storage unit 431 and the depth minute variation predicted image calculated in step S1523 and calculates an evaluation value (step S1524 in FIG. 12). The difference image generation and evaluation value calculation are done using the same method as in step S1300 in which the second viewpoint predicted image in step S1300 is replaced with the horizontal minute variation predicted image.

The moving amount updating unit 422 calculates a depth gradient amount by subtracting the evaluation value stored in the memory of the second difference image storage unit 434 from the evaluation value calculated in step S1524 (step S1525 in FIG. 12).

The operation of causing the moving amount updating unit 422 to calculate updated moving data will be described. The moving amount updating unit 422 calculates the horizontal component of updated moving data by adding the product of the horizontal gradient amount and a predetermined constant A to the horizontal component of the moving data stored in the moving amount storage unit 421. The predetermined constant A is, e.g., 10.

The moving amount updating unit 422 calculates the depth component of updated moving data by adding the product of the depth gradient amount and the predetermined constant A to the depth component of the moving data stored in the moving amount storage unit 421.

Hence, the moving amount updating unit 422 calculates the values of the horizontal component and depth component of updated moving data based on the moving data (step S1530 in FIG. 10). The values of the remaining components of the updated moving data are the values of corresponding components of the moving data.

Next, the second viewpoint predicted image generation unit 412 generates a second viewpoint predicted image based on the updated moving data and the first viewpoint image stored in the memory of the first viewpoint image storage unit 411 (step S1600 in FIG. 7).

Figure 13:
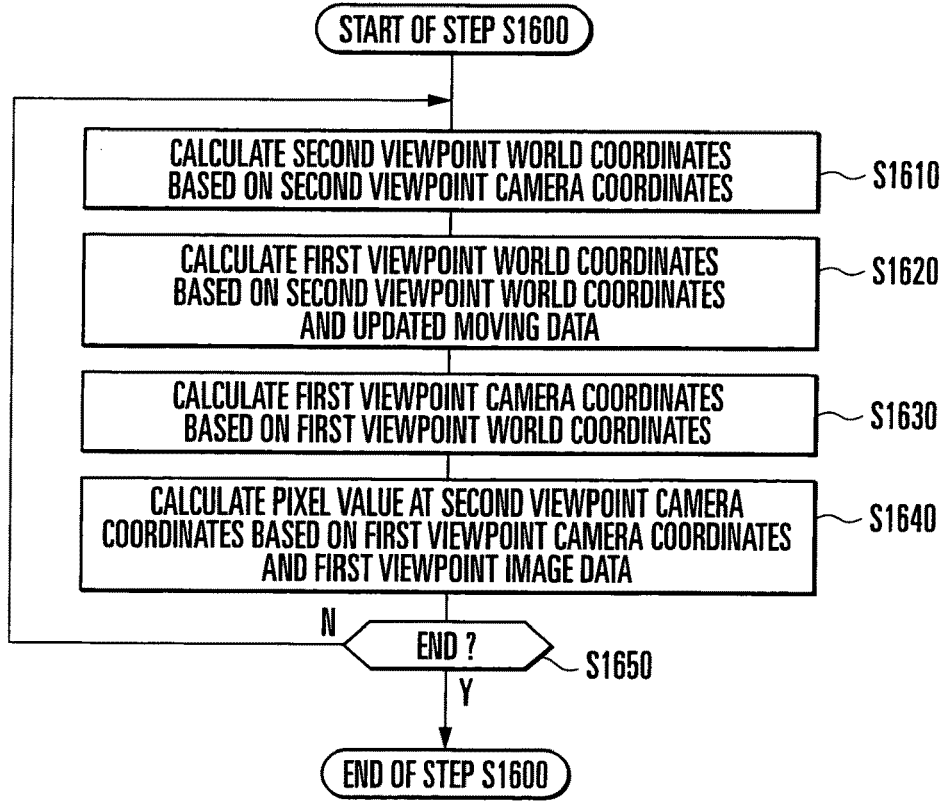
FIG. 13 is a flowchart for explaining an operation of generating a second viewpoint predicted image based on updated moving data and a first viewpoint image.

The operation of generating the second viewpoint predicted image based on the updated moving data and the first viewpoint image will be described. FIG. 13 is a flowchart for explaining the operation of generating the second viewpoint predicted image based on the updated moving data and the first viewpoint image (the operation in step S1600).

The second viewpoint predicted image generation unit 412 performs the following operation for all pixels whose pixel values are to be obtained in the second viewpoint predicted image. More specifically, the second viewpoint predicted image generation unit 412 calculates world coordinate values at the second viewpoint corresponding to the camera coordinate values of a pixel included in the second viewpoint predicted image (step S1610 in FIG. 13).

The second viewpoint predicted image generation unit 412 calculates world coordinate values at the first viewpoint based on the world coordinate values at the second viewpoint and the updated moving data (step S1620 in FIG. 13). Next, the second viewpoint predicted image generation unit 412 calculates camera coordinate values at the first viewpoint based on the calculated world coordinate values at the first viewpoint (step S1630 in FIG. 13). Additionally, the second viewpoint predicted image generation unit 412 calculates the pixel value of the pixel in the second viewpoint predicted image based on the first viewpoint image stored in the memory of the first viewpoint image storage unit 411 (step S1640 in FIG. 13).

Normally, the camera coordinate values at the first viewpoint which are obtained in step S1630 and, more particularly, the camera coordinate values at the first viewpoint corresponding to the pixel value obtained in step S1640 are not integers. Hence, the camera coordinate values at the first viewpoint obtained in step S1630 are assumed to be values (integers) interpolated by, e.g., bilinear interpolation.

If the pixel values of all pixels in the second viewpoint predicted image are calculated (Y in step S1650 of FIG. 13), the process advances to step S1700 in FIG. 7. Otherwise (N in step S1650 of FIG. 13), the process returns to step S1610 to calculate the pixel value of another pixel.

That is, the second viewpoint predicted image generation unit 412 calculates the pixel values of all pixels included in the second viewpoint predicted image based on the updated moving data and the first viewpoint image, thereby generating the second viewpoint predicted image.

The second viewpoint predicted image storage unit 413 stores the second viewpoint predicted image generated by the second viewpoint predicted image generation unit 412 (step S1700 in FIG. 7).

The difference image generation unit 432 generates a difference image between the second viewpoint image and the second viewpoint predicted image and calculates an evaluation value based on the generated difference image. The difference image generation unit 432 stores, in the memory of the first difference image storage unit 433, the generated difference image and the evaluation value calculated based on the difference image (step S1800 in FIG. 7). The operation of the difference image generation unit 432 in step S1800 is the same as that of the difference image generation unit 432 in step S1300, and a description thereof will not be repeated.

The moving amount storage unit 421 compares the evaluation value stored in the memory of the first difference image storage unit 433 with the evaluation value stored in the memory of the second difference image storage unit 434. If the evaluation value stored in the memory of the first difference image storage unit 433 is smaller than the evaluation value stored in the memory of the second difference image storage unit 434, the process advances to step S2000 (Y in step S1900). Otherwise, the process advances to step S2300 (NO in step S1900).

In this example, the moving amount storage unit 421 compares the evaluation value of the second viewpoint predicted image generated based on the initial moving data and the first viewpoint image (the evaluation value stored in the memory of the second difference image storage unit 434) with the evaluation value of the second viewpoint predicted image generated based on the updated moving data and the first viewpoint image (the evaluation value stored in the memory of the first difference image storage unit 433).

In step S2000, the moving amount storage unit 421 stores, in its memory, the updated moving data used to generate the predicted image in step S1600.

The second difference image storage unit 434 stores, in its memory, the difference image and the evaluation value stored in the memory of the first difference image storage unit 433 (step S2100 in FIG. 7).

The moving amount updating unit 422 determines whether to continue moving amount updating. More specifically, for example, if the moving data has been updated a predetermined updating count or more, the process advances to step S2300 (N in step S2200 in FIG. 7). Otherwise, the process returns to step S1500 (Y in step S2200 in FIG. 7).

In step S2300, the image processing unit 435 executes image processing for the difference image stored in the memory of the second difference image storage unit 434 (step S2300 in FIG. 7). An example of the image processing to be executed for the difference image is image processing using a minimum value filter.

The binary image generation unit 441 binarizes, using a predetermined method, the difference image calculated and processed by the image processing unit 435 (step S2400 in FIG. 7).

The labeling image generation unit 442 performs labeling processing of labeling the difference image binarized in step S2400 (step S2500 in FIG. 7). The labeling processing is processing of obtaining a 4-concatenated region or an 8-concatenated region and labeling (adding a label to) each concatenated region.

A 4-concatenated region is formed by concatenating other pixels adjacent to a given pixel in four directions, i.e., upper, lower, left, and right directions. This region is formed by concatenating pixels having the same pixel value. An 8-concatenated region is formed by concatenating other pixels adjacent to a given pixel in eight directions, i.e., upper, lower, left, right, upper right, lower right, upper left, and lower left directions. This region is formed by concatenating pixels having the same pixel value.

Finally, the obstacle presence determination unit 443 performs obstacle presence determination (step S2600 in FIG. 7). More specifically, if a labeled region has a predetermined size or more, the obstacle presence determination unit 443 determines that an obstacle exists.

According to this exemplary embodiment, to reduce noise generated by moving data errors, moving data to be used to convert image data sensed at the first viewpoint into image data at the second viewpoint is updated such that an evaluation value calculated based on image data sensed at the second viewpoint and image data converted from the first viewpoint to the second viewpoint using moving data obtained from the moving amount measurement unit 300 as an initial value is decreased using a gradient method as one of optimization methods. It is therefore possible to obtain a difference image containing minimum noise generated by moving amount errors.

According to this exemplary embodiment, a difference image is used, and additionally, image processing (e.g., image processing using a minimum value filter) is executed for the difference image to reduce still remaining noise (noise which is generated by moving data errors and still remains after processing of reducing the noise generated by the moving data errors, and noise generated by other factors). To reduce the influence of noise that cannot completely be eliminated yet, the difference image that has undergone the image processing is binarized and labeled. Then, determination is done based on, e.g., the size of a binarized region based on the labeling result. This enables to improve the obstacle determination accuracy.

The obstacle detection system of this exemplary embodiment performs the following processes in addition to the related art.

1. (Addition of moving amount updating) To reduce noise generated in a difference image by moving amount errors, a moving amount to be used to convert an image sensed at the first viewpoint into an image at the second viewpoint is updated using a gradient method as one of optimization methods such that an evaluation value (e.g., a value obtained by dividing the sum of luminance differences within an effective range by the number of pixels in the effective range) calculated based on an image sensed at the second viewpoint and an image converted from the first viewpoint to the second viewpoint using a moving amount obtained from the moving amount measurement unit 300 as an initial value is decreased. A difference image is generated based on a predicted image converted from the first viewpoint to the second viewpoint using the updated moving amount, thereby calculating and generating a moving amount and a difference image suitable for obstacle detection.

2. (Image processing) Image processing is executed for the difference image to reduce noise that still remains in the difference image (noise which is generated by moving amount errors and still remains after the above-described processing 1, and noise generated by other factors).

3. (Binary image generation, labeled image generation, and obstacle present determination) To reduce still remaining noise, binarization and labeling results of the difference image that has undergone the image processing are input, and determination is done based on, e.g., the size of a binarized region.

The objects of the present invention are achieved by performing the above-described processing.

Note that a moving amount calculation system is formed by removing the obstacle detection unit 440 from the constituent elements of the obstacle detection system of this exemplary embodiment.

The exemplary embodiment of the present invention will be described next using a detailed example.

Figure 14:
FIG. 14 is a view showing an example of a first viewpoint image.
Figure 15:
FIG. 15 is a view showing an example of a second viewpoint image.

As a detailed example, assume that image data shown in FIG. 14 is stored in the memory of the first viewpoint image storage unit 411 as a first viewpoint image, and image data shown in FIG. 15 is stored in the memory of the second viewpoint image storage unit 431 as a second viewpoint image in step S1000 of FIG. 7.

The first viewpoint image shown in FIG. 14 is sensed by the camera 200, in which a rectangular parallelepiped obstacle 1 is placed at the center, a rectangular parallelepiped obstacle 2 is placed on the left side of the obstacle 1, and a rectangular parallelepiped obstacle 3 is placed on the right side of the obstacle 1. A rectangular parallelepiped obstacle 4 is placed behind the obstacle 1. A straight line 5 runs from the lower end of the image shown in FIG. 14 to an intermediate position between the obstacle 1 and the obstacle 4 while passing through under the obstacle 1.

The image shown in FIG. 15 is obtained by sensing the image sensing targets in FIG. 14 at closer range.

Assume that a horizontal component moving amount of 0 mm, a depth component moving amount of 200 mm, and a rotation amount of 1 rad about a vertical axis passing through a point corresponding to a horizontal component moving amount of 0 mm and a depth component moving amount of 0 mm are stored in the memory of the moving amount storage unit 421 as initial moving data obtained from the moving amount measurement unit 300 in step S1000 of FIG. 7.

The moving data will be represented by (x,y,θ) hereinafter, where x is the horizontal component moving amount (unit: mm), y is the depth component moving amount (unit: mm), and θ is the rotation amount about the vertical axis passing through the origin of the x-y plane (unit: rad).

In addition, x and y form a left-handed coordinate system, and θ is set positive counterclockwise. For example, the horizontal component moving amount x=0 mm, the depth component moving amount y=200 mm, and the rotation amount θ about a vertical axis=0 rad are represented by (0,200,0). That is, the initial moving data is (0,200,0).

In this detailed example, a luminance value is used as a pixel value in an image. Additionally, in this detailed example, a region where a camera image is converted into world coordinates or a region where world coordinates are converted into camera coordinates is defined in advance as a region that is located a height of 0 mm on the world coordinates and has the horizontal and depth directions shown in FIG. 16. This region will be referred to as a conversion region.

Figure 16:
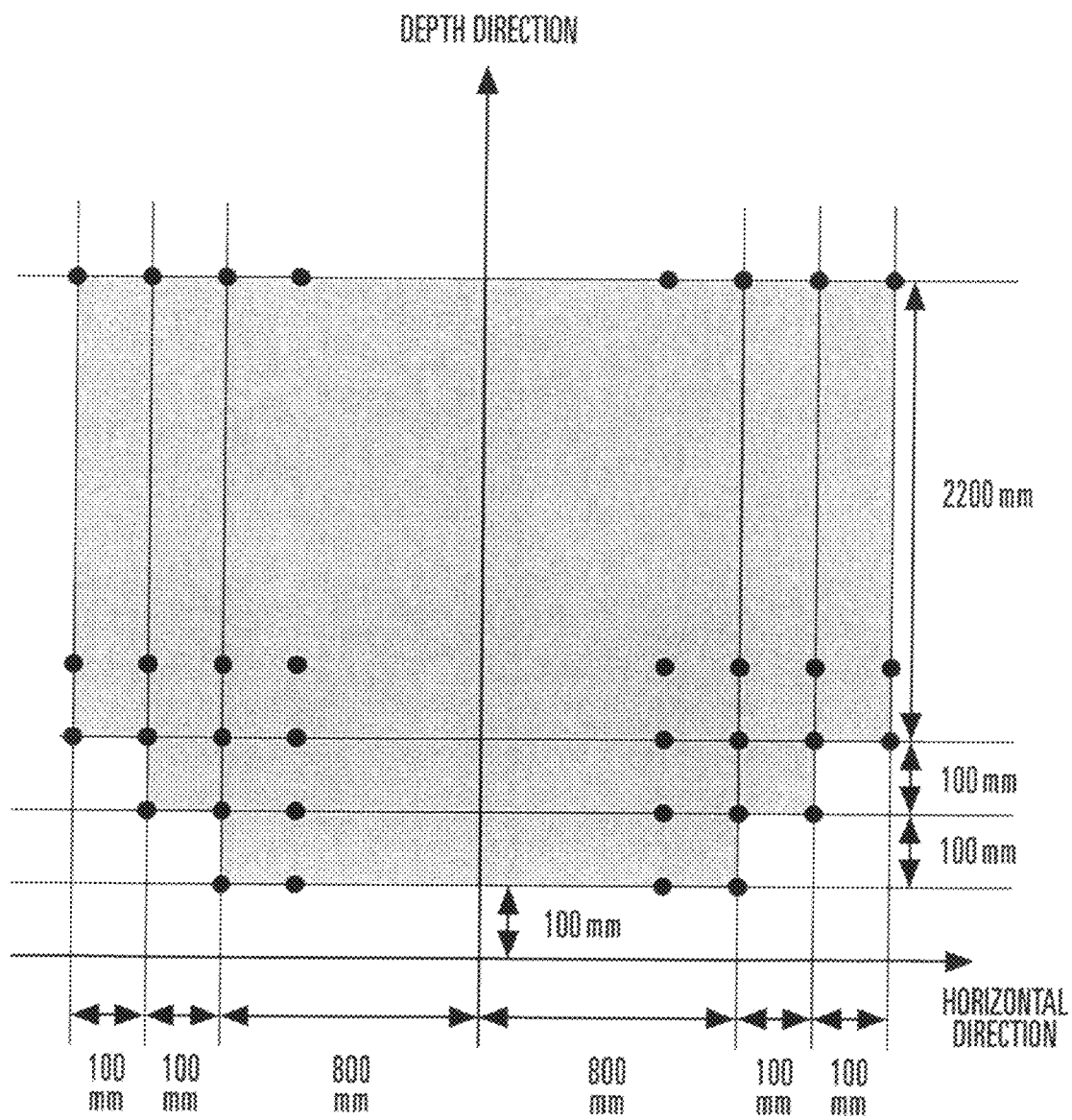
FIG. 16 is an explanatory view showing an example of a conversion region.

In the example shown in FIG. 16, the conversion region includes a region which is surrounded by a horizontal straight line passing through a point 300 mm distant from the origin in the depth direction, a horizontal straight line passing through a point 2,500 mm distant from the origin in the depth direction, a depth straight line passing through a point 1,000 mm distant from the origin to the right in the horizontal direction, and a depth straight line passing through a point 1,000 mm distant from the origin to the left in the horizontal direction on the world coordinates.

In the example shown in FIG. 16, the conversion region also includes a region which is surrounded by a horizontal straight line passing through a point 200 mm distant from the origin in the depth direction, a horizontal straight line passing through a point 300 mm distant from the origin in the depth direction, a depth straight line passing through a point 900 mm distant from the origin to the right in the horizontal direction, and a depth straight line passing through a point 900 mm distant from the origin to the left in the horizontal direction on the world coordinates.

In the example shown in FIG. 16, the conversion region also includes a region which is surrounded by a horizontal straight line passing through a point 100 mm distant from the origin in the depth direction, a horizontal straight line passing through a point 200 mm distant from the origin in the depth direction, a depth straight line passing through a point 800 mm distant from the origin to the right in the horizontal direction, and a depth straight line passing through a point 800 mm distant from the origin to the left in the horizontal direction on the world coordinates.

In the conversion region, lattice points are set at an interval of 100 mm. In the example shown in FIG. 16, several lattice points are indicated by filled circles.

Figure 17:
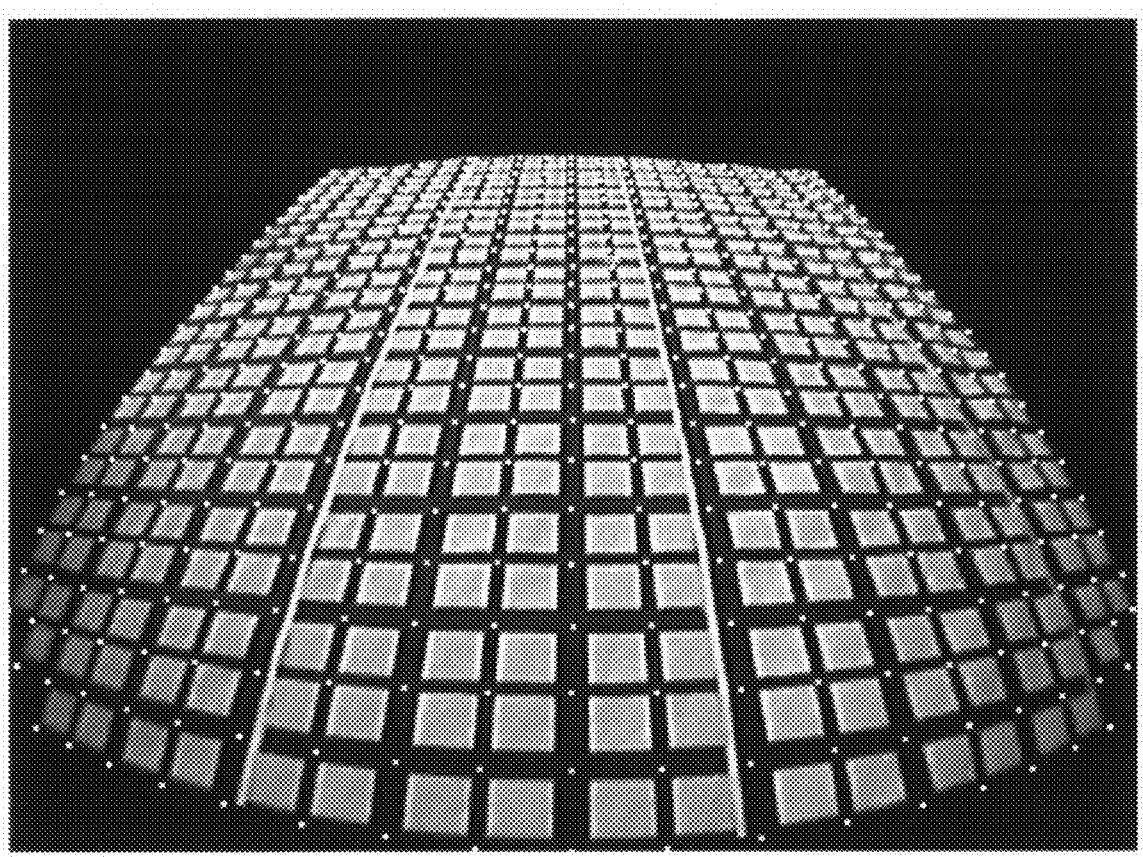
FIG. 17 is an explanatory view showing the conversion region on camera coordinates.

FIG. 17 is a view for explaining the conversion region in FIG. 16 on the camera coordinates. In the example shown in FIG. 17, the conversion region is divided into cells at an interval of 100 mm. Lattice points corresponding to the lattice points of world coordinates are represented by open circles at the corners of each cell.

Note that the camera coordinate values of the lattice points are obtained in advance. A region in a camera image at the second viewpoint corresponding to a common region which is the conversion region on the world coordinates at the first viewpoint and also the conversion region on the world coordinates at the second viewpoint will be referred to as a second viewpoint effective region. That is, if an image sensing target is a point on a plane on the first world coordinates (and the second world coordinates), it should be included in both the camera image at the first viewpoint and the camera image at the second viewpoint.

Figure 18:
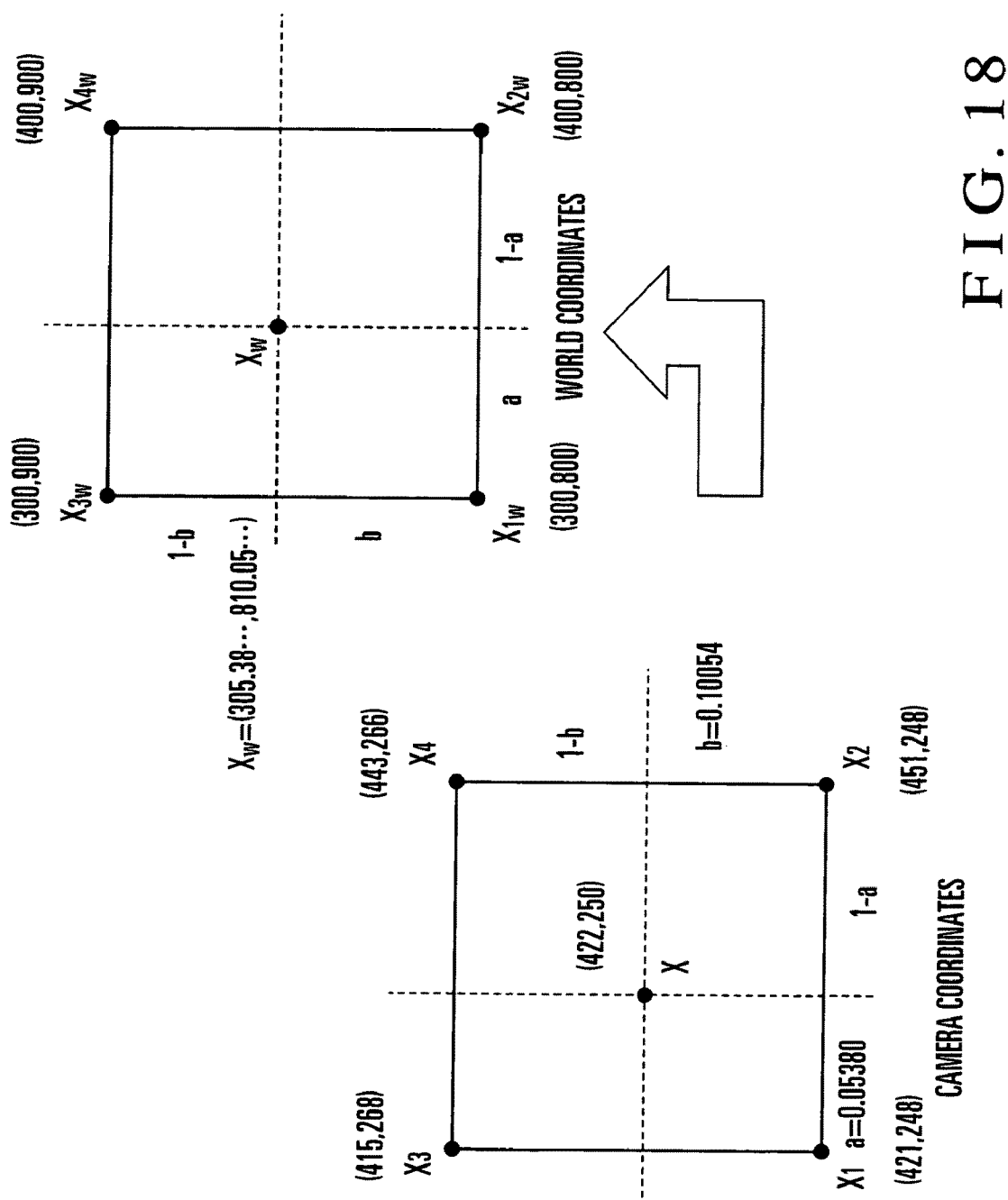
FIG. 18 is an explanatory view schematically showing conversion from camera coordinates to world coordinates.

Conversion from camera coordinates to world coordinates is done using the correspondence between the camera coordinates and the world coordinates of lattice points. FIG. 18 schematically shows conversion from camera coordinates to world coordinates. For example, the world coordinates and camera coordinates of lattice points are made to correspond by setting camera coordinates (421,248), (451,248), (415, 268), and (443,266) for lattice points (300,800), (400,800), (300,900), and (400,900) on the world coordinate system.

At this time, camera coordinates (422,250) are represented by (422,250)=(421,248)+a((451,248)−(421,248))+b((415, 268)−(421,248)), a=0.05380 . . . , b=0.10054 . . . .

World coordinates corresponding to the camera coordinates are calculated by (300,800)+a((400,800)−(300,800))+b((300,900)−(300,800))=(305.3802 . . . , 810.0540 . . . )

Conversion from world coordinates to camera coordinates is done using the correspondence between the world coordinates and camera coordinates of lattice points and the correspondence between the camera coordinates and world coordinates of lattice points. More specifically, the correspondence between the camera coordinate system and the world coordinate system of each pixel, which is obtained by bilinear interpolation based on the correspondence between the world coordinates and the camera coordinates of the lattice points arranged at an interval of 100 mm in the conversion region shown in FIG. 16, is obtained by bilinear interpolation. Conversion from world coordinates to camera coordinates is done by bilinear interpolation using the correspondence.

For example, world coordinates corresponding to camera coordinates (409,287), (410,287), (409,288), and (410,288) are (301.8378 . . . , 1007.9637 . . . ), (305.8190 . . . , 1008.54928), (303.6702 . . . , 1015.9043 . . . ), and (307.6455 . . . , 1016.4640 . . . ), respectively.

Hence, the camera coordinates of the point at world coordinates (305.3802 . . . , 1010.0540 . . . ) are calculated as (410.0001 . . . , 288.0001 . . . )

To define the luminance value of the point at the camera coordinates (410.0001 . . . , 288.0001 . . . ), bilinear interpolation is used, and the resultant value is rounded off to the nearest integer. For example, if the luminance values of points at camera coordinates (410, 288), (411,288), (410,289), and (411,289) are 127, 129, 128, and 127, respectively, the luminance value at the camera coordinates (410.0001 . . . , 288.0001 . . . ) is calculated as 127.

The operation in this detailed example will be described next. To generate a second viewpoint predicted image, the units of the arithmetic device 400 execute the processes in steps S1110 to S1140 of FIG. 8 for all pixels belonging to the second viewpoint effective region.

For example, the pixel value at coordinates (422,250) of the second viewpoint predicted image is calculated in the following way. First, the second viewpoint predicted image generation unit 412 executes the process in step S1110 of FIG. 8. Second viewpoint world coordinates corresponding to the point at second viewpoint camera coordinates (422,250) are (305.3802 . . . , 810.0540 . . . ), as described above.

Next, the second viewpoint predicted image generation unit 412 executes the process in step S1120 of FIG. 8. Let (xw1,yw1) be the first viewpoint world coordinates, (xw2, yw2) be the second viewpoint world coordinates, and $(x,y,\theta)$ be the moving data. Then, $xw1=x+\cos(\theta)\cdot xw2-\sin(\theta)\cdot yw2$, and $yw1=y+\sin(\theta)\cdot xw2-\cos(\theta)\cdot yw2$.

As described above, the second viewpoint world coordinates are (305.3802 . . . , 810.0540 . . . ), and the initial moving data is (0,200,0). Hence, the first viewpoint world coordinates are (305.3802 . . . , 1010.0540 . . . )

The second viewpoint predicted image generation unit 412 executes the process in step S1130 of FIG. 8. First viewpoint camera coordinates corresponding to the point at the first viewpoint world coordinates (305.3802 . . . , 1010.0540 . . . ) are (410.0001 . . . , 288.0001 . . . ), as described above.

Figure 19:
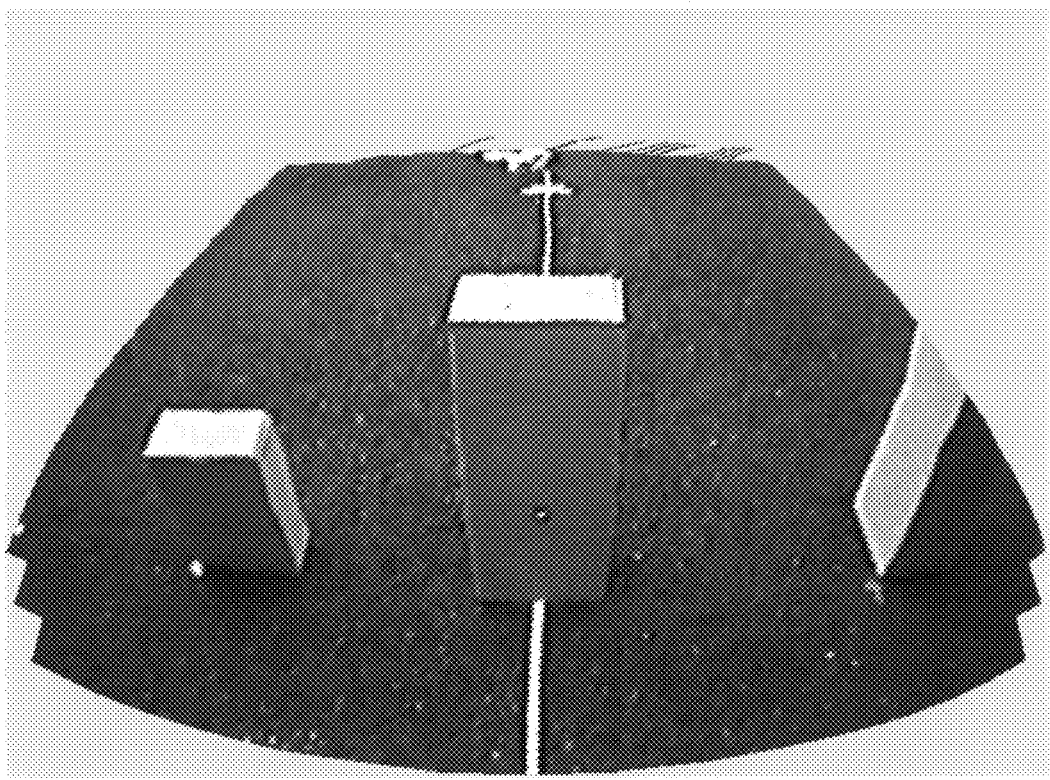
FIG. 19 is a view showing a second viewpoint predicted image generated in a detailed example.

Next, the second viewpoint predicted image generation unit 412 executes the process in step S1140 of FIG. 8. The luminance value at the first viewpoint camera coordinates is 127, as described above. This value is defined as the luminance value at the coordinates (422,250) of the second viewpoint predicted image. With this calculation, a second viewpoint predicted image as shown in FIG. 19 is obtained in step S1100 of FIG. 7. FIG. 19 shows the second viewpoint predicted image generated in the detailed example. FIG. 19 shows that the obstacle 1 is placed at the center, the obstacle 2 is placed on the left side of the obstacle 1, and the obstacle 3 is placed on the right side of the obstacle 1. In FIG. 19, the straight line 5 runs from the lower end of the image to a point near the upper end of the image while passing through under the obstacle 1.

The second viewpoint predicted image storage unit 413 stores, in its memory, the second viewpoint predicted image generated by the second viewpoint predicted image generation unit 412 (step S1200 in FIG. 7).

The difference image generation unit 432 executes the process in step S1310 of FIG. 9 to calculate and generate a difference image based on the second viewpoint image and the second viewpoint predicted image stored in the memory of the second viewpoint predicted image storage unit 413. The pixel value of each pixel of the difference image is calculated by obtaining, for all pixels in the second viewpoint effective region, the absolute value of the luminance difference between pixels having the same coordinate values in the second viewpoint predicted image and the second viewpoint image.

Figure 20:
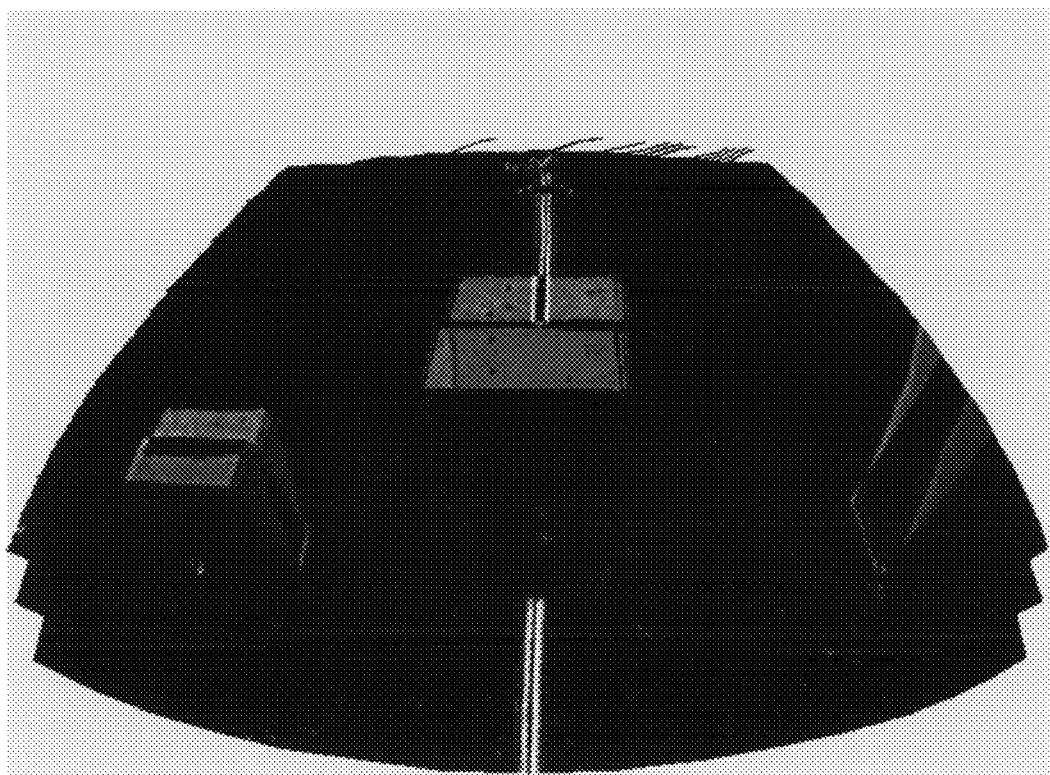
FIG. 20 is a view showing a difference image generated by the difference image generation unit in the 0th updating cycle in a detailed example.

FIG. 20 shows the difference image generated by causing the difference image generation unit 432 to execute the process in step S1310 of FIG. 9. FIG. 20 shows the difference image generated by the difference image generation unit 432. In the example shown in FIG. 20, two obstacles 1 are drawn at the center of the difference image, two obstacles 2 are drawn on the left side of the obstacles 1, and two obstacles 3 are drawn on the right side of the obstacles 1. The obstacles are superimposed in the depth direction of the corresponding obstacles. That is, the two obstacles 1 are drawn at the center of the difference image while being arranged in a line in the depth direction. Additionally, two straight lines 5 are drawn in parallel from the lower end of the difference image to a point near the upper end of the difference image while passing through under one of the obstacles 1.

In the example shown in FIG. 20, the portion of the straight lines 5, which should be a texture (pattern) on a plane, has large pixel values because of errors of moving data and other factors.

The difference image generation unit 432 executes the process in step S1320 of FIG. 9 to divide the sum of all luminance values belonging to a region in the difference image corresponding to the second viewpoint effective region by the number of pixels belonging to the second viewpoint effective region, thereby obtaining the evaluation value. In the example shown in FIG. 20, the evaluation value is 18.481216.

The difference image and the evaluation value, which are stored in the memory of the first difference image storage means 433, are stored in the memory of the second difference image storage unit 434 (step S1400 in FIG. 7).

The moving amount updating unit 422 executes the process in step S1500 of FIG. 7. More specifically, the moving amount updating unit 422 executes the process in step S1510 of FIG. 10 to calculate the change amount of the evaluation value with respect to a horizontal minute amount. In this detailed example, the calculation is done by setting the horizontal minute amount to 1. Hence, the horizontal minute variation moving data calculated by the moving amount updating unit 422 in step S1512 of FIG. 11 is (1,200,0).

The processes in step S1513 and S1514 of FIG. 11 are the same as those in steps S1100 and S1300 of FIG. 7, in which the moving data is replaced with horizontal minute variation moving data, and a description thereof will be omitted. The evaluation value calculated by the moving amount updating unit 422 in step S1514 of FIG. 11 is 18.10655. The horizontal gradient calculated by the moving amount updating unit 422 in step S1515 of FIG. 11 is −0.122362 which is obtained by subtracting the evaluation value stored in the memory of the second difference image storage unit 434 from the evaluation value calculated in step S1514 of FIG. 11.

The moving amount updating unit 422 executes the process in step S1520 of FIG. 10 to calculate the change amount of the evaluation value with respect to a depth minute amount. In this detailed example, the calculation is done by setting the depth minute amount to 1. Hence, the depth minute variation moving data calculated by the moving amount updating unit 422 in step S1522 of FIG. 12 is (0,201,0).

The processes in step S1523 and S1524 of FIG. 12 are the same as those in steps S1100 and S1300 of FIG. 7, in which the moving data is replaced with depth minute variation moving data, and a description thereof will be omitted. The evaluation value calculated by the moving amount updating unit 422 in step S1524 of FIG. 12 is 18.2185. The depth gradient calculated by the moving amount updating unit 422 in step S1525 of FIG. 12 is −0.009544 which is obtained by subtracting the evaluation value stored in the memory of the second difference image storage unit 434 from the evaluation value calculated in step S1524 of FIG. 12.

Next, the moving amount updating unit 422 executes the process in step S1530 of FIG. 10. In this detailed example, the predetermined constant A is 10. Hence, the updated moving data is calculated as (1.2236 . . . , 200.0954 . . . , 0).

Figure 21:
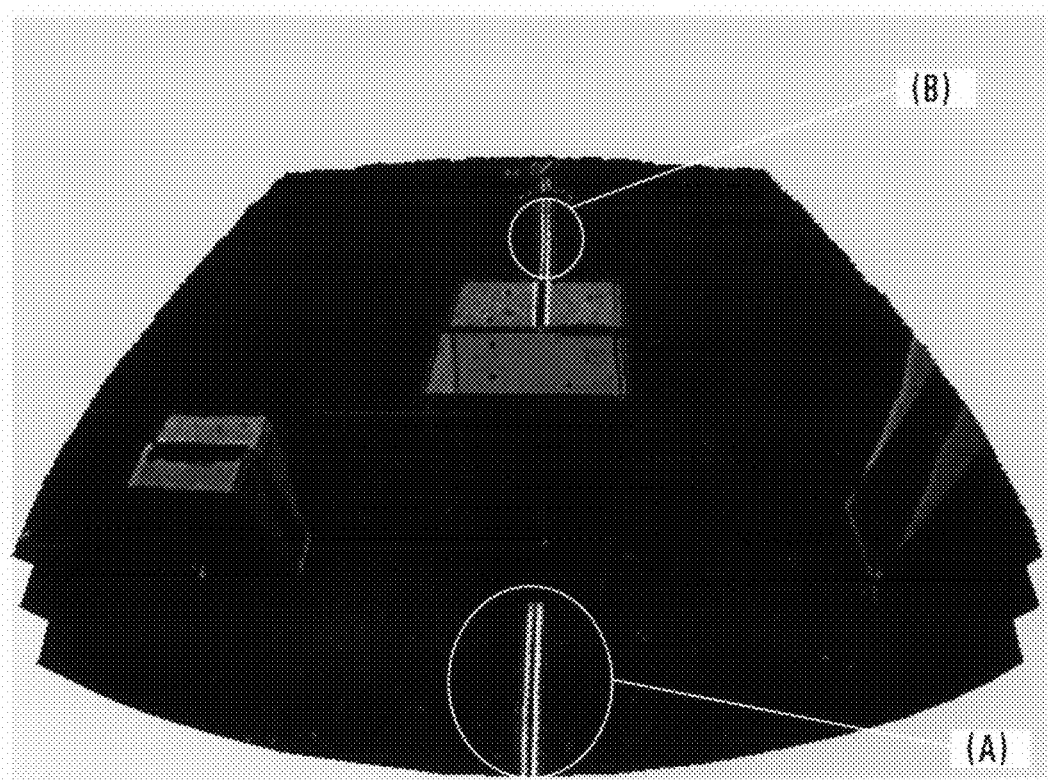
FIG. 21 is a view showing a difference image generated by the difference image generation unit in the first updating cycle in a detailed example.

The operations in step S1600 to S1800 of FIG. 7 are the same as those in steps S1100 to S1300, in which the moving data is replaced with updated moving data, and a description thereof will be omitted. FIG. 21 shows a difference image calculated by the difference image generation unit 432 in step S1800 of FIG. 7. The difference image shown in FIG. 21 is generated using moving data updated once. The evaluation value is 18.324844. The difference image shown in FIG. 21 includes the straight lines 5 (portions indicated by (A) and (B) in FIG. 21).

The evaluation value calculated in step S1800 described above is 18.324844. The evaluation value stored in the memory of the second difference image storage unit 434 is 18.481216. Hence, the moving amount storage unit 421 determines to execute the process in step S2000 of FIG. 7 (Y in step S1900 of FIG. 7).

The moving amount storage unit 421 executes the process in step S2000 of FIG. 7 to store the updated moving data in the memory of the moving amount storage unit 421 as new moving data.

The second difference image storage unit 434 executes the process in step S2100 of FIG. 7 to store, in its memory, the difference image and the evaluation value which are stored in the memory of the first difference image storage unit 433.

In this detailed example, the moving amount updating unit 422 executes the process in step S2200 of FIG. 7 to determine not to continue the processing if the moving amount updating count exceeds a predetermined value "9" and or continue the processing otherwise. Since the current moving amount updating count is 1, the moving amount updating unit 422 determines to continue the processing so that the processing from step S1500 of FIG. 7 is continued.

In this detailed example, when the moving amount storage unit 421 determines in step S1900 of FIG. 7 not to store, or when the moving amount updating unit 422 determines in step S2200 of FIG. 7 not to continue the processing, the processing from step S2300 of FIG. 7 is performed. In this detailed example, the moving amount storage unit 421 does not determine in step S1900 of FIG. 7 not to store even when the moving amount updating count exceeds 9. Hence, the moving amount updating unit 422 determines in step S2200 of FIG. 7 in the 10th moving amount updating cycle not to continue the processing.

Figure 22:
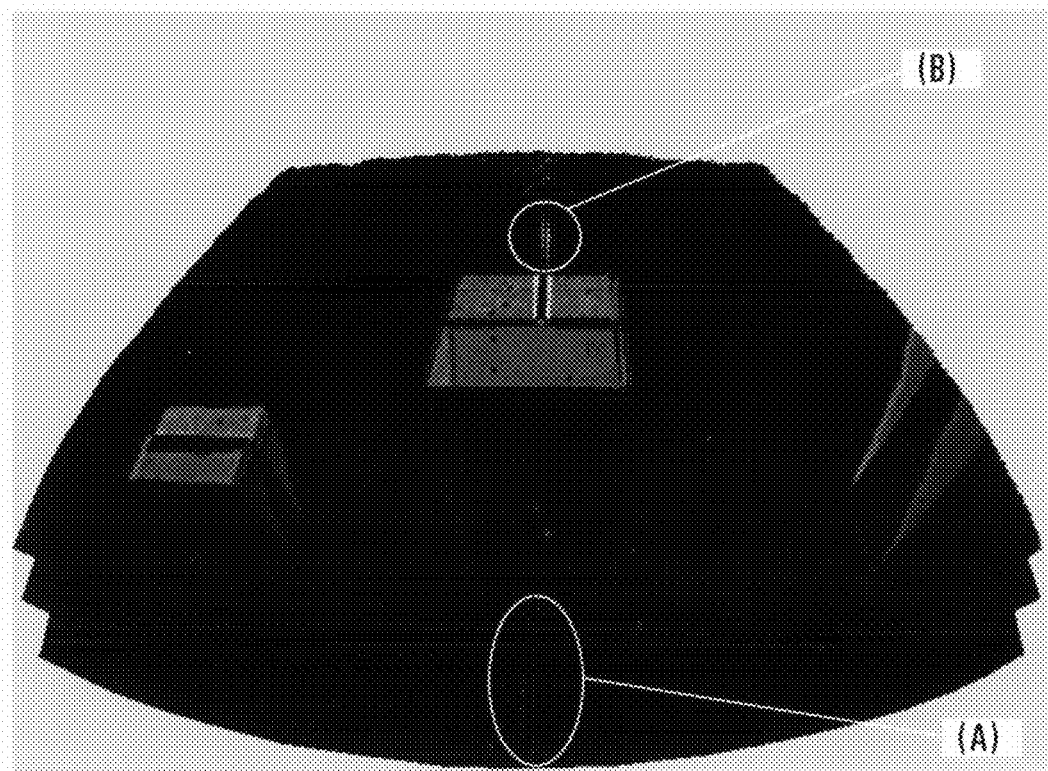
FIG. 22 is a view showing a difference image generated by the difference image generation unit in the 10th updating cycle in a detailed example.

FIG. 22 shows the image stored in the memory of the second difference image storage unit 434 at this time. FIG. 22 shows a difference image which is generated based on the moving data updated 10 times and stored in the memory of the second difference image storage unit 434. In the example shown in FIG. 22, noise (part of the straight line 5; a portion indicated by (A) in FIG. 22) that was present between the obstacle 1 and the lower end of the difference image is reduced. However, noise (part of the straight line 5; a portion indicated by (B) in FIG. 22) that was present between the obstacle 1 and a point near the upper end of the difference image still remains. The image processing unit 435 executes the process in step S2300 of FIG. 7.

Figure 23:
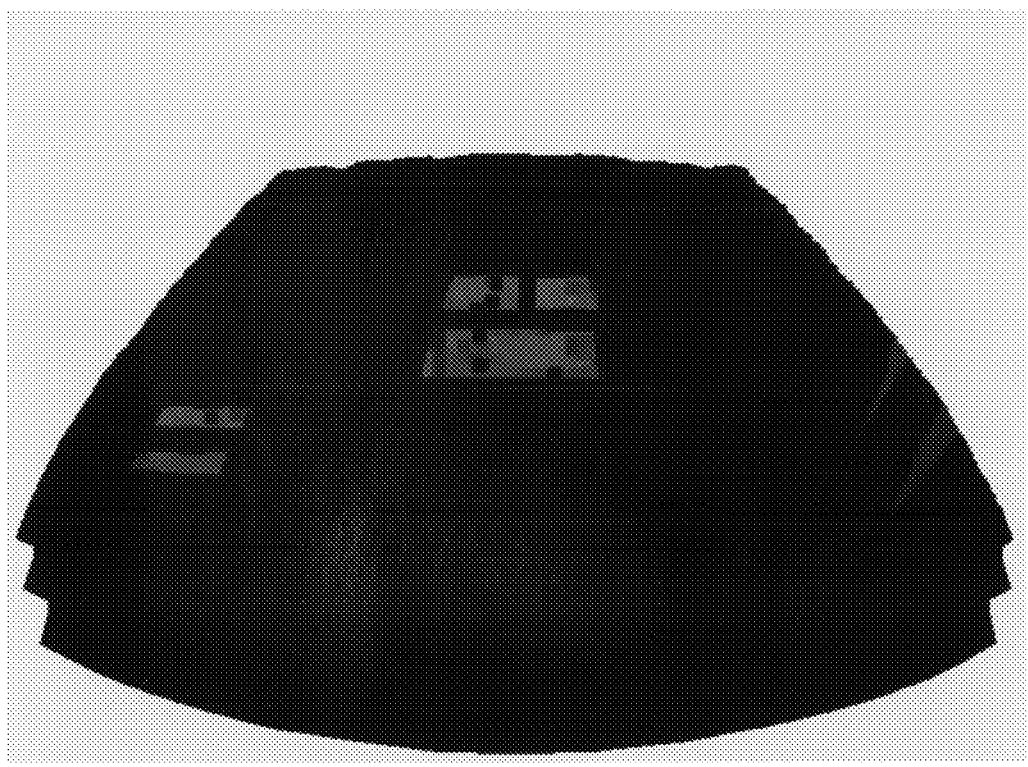
FIG. 23 is a view showing a difference image which has undergone filter processing three times.

In this detailed example, the image processing unit 435 executes filter processing using a 3×3 minimum value filter three times in step S2300 of FIG. 7. FIG. 23 shows a difference image which has undergone filter processing three times. In the example shown in FIG. 23, noise components that were present at the positions (A) and (B) in the images shown in FIGS. 21 and 22 are eliminated. In the example shown in FIG. 23, the upper surface regions of the obstacles 1 and 2 and a partial region of the surface of the obstacle 3 facing the obstacle 1 are represented by white, and the remaining regions are represented by black.

Figure 24:
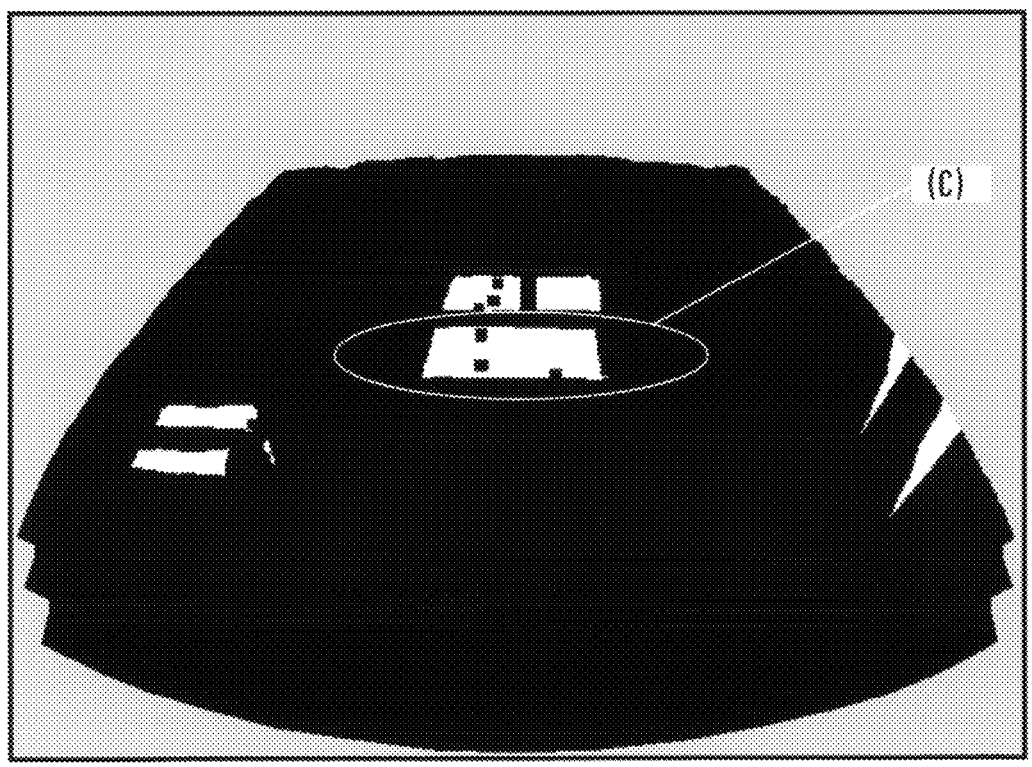
FIG. 24 is a view showing a binarized difference image.
Figure 25:
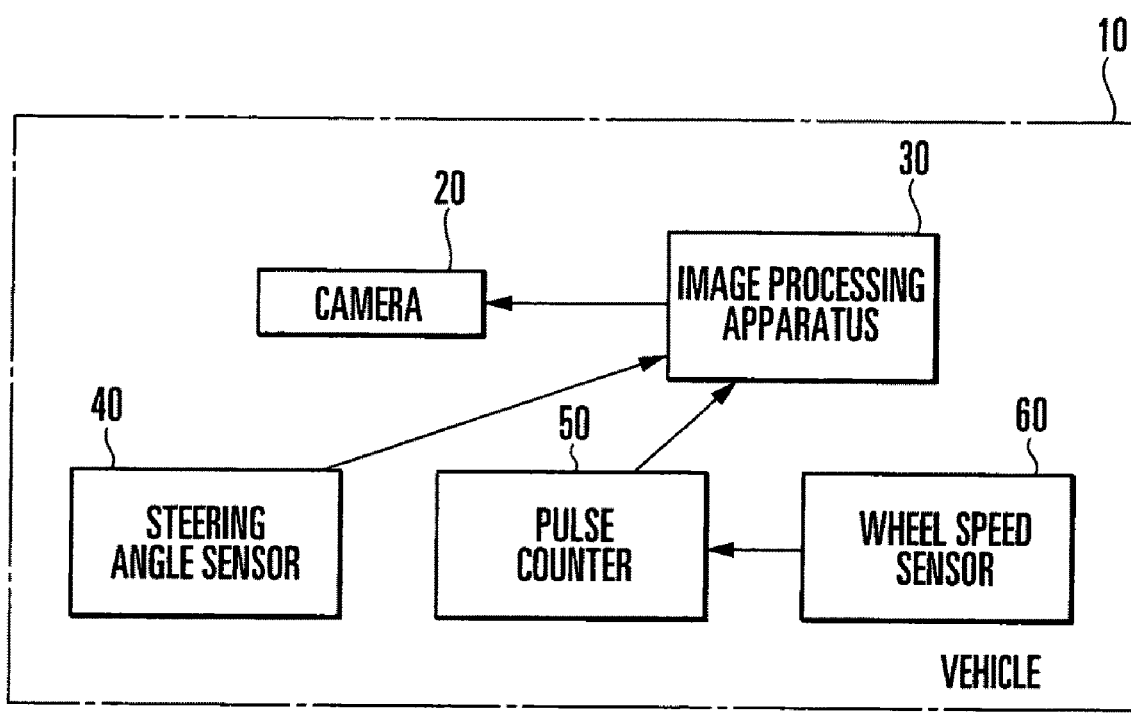
FIG. 25 is a block diagram showing an example of the arrangement of an obstacle detection system related to the present invention.

The binary image generation unit 441 executes the process in step S2400 of FIG. 7 to binarize the difference image shown in FIG. 23 based on a predetermined threshold value (40). FIG. 24 shows the binarized difference image. In the example shown in FIG. 24, the upper surface regions of the obstacles 1 and 2 and a partial region of the surface of the obstacle 3 facing the obstacle 1 are represented by white, and the remaining regions are represented by black.

The labeling image generation unit 442 executes the process in step S2500 of FIG. 7. In this detailed example, the labeling image generation unit 442 performs 4-concatenation labeling processing. For example, a region indicated by (C) in FIG. 24 is obtained as a concatenated region having the same label.

The obstacle presence determination unit 443 executes the process in step S2600 of FIG. 7 to determine that an obstacle exists when the number of pixels belonging to the same label in the binarized image shown in FIG. 24 is equal to or larger than a predetermined number (in this detailed example, 20). In this detailed example, the number of pixels in the labeled region indicated by (C) in FIG. 24 is 3,237. Hence, the obstacle presence determination unit 443 determines that an obstacle exists.

The moving amount calculation method is not limited to the form of the detailed example. For example, the moving amount of the moving body 100 can accurately be calculated when a moving amount is calculated from a moving body position obtained using, e.g., a GPS (Global Positioning System).

According to this detailed example, to reduce noise generated by moving data errors, moving data to be used to convert image data sensed at the first viewpoint into image data at the second viewpoint is updated such that an evaluation value calculated based on image data sensed at the second viewpoint and image data converted from the first viewpoint to the second viewpoint using moving data obtained from the moving amount measurement unit 300 as an initial value is decreased. It is therefore possible to obtain a difference image containing minimum noise generated by moving amount errors.

According to this detailed example, a difference image is used, and additionally, image processing is executed for the difference image to reduce still remaining noise (noise which is generated by moving data errors and still remains after processing of reducing the noise generated by the moving data errors, and noise generated by other factors). To reduce the influence of noise that cannot completely be eliminated yet, the difference image that has undergone the image processing is binarized and labeled. Then, determination is done based on, e.g., the size of a binarized region based on the labeling result. This enables to improve the obstacle determination accuracy.

As described above, the moving amount updating unit 422 may change the horizontal component moving amount by a predetermined variation amount, generate a horizontal minute variation predicted image based on the first viewpoint image and the changed horizontal component moving amount, generate a difference image between the horizontal minute variation predicted image and the second viewpoint image, calculate an evaluation value representing the coincidence between the horizontal minute variation predicted image and the second viewpoint image, and calculate the horizontal component moving amount based on the variation amount and the evaluation value.

The obstacle detection unit 440 may determine that an obstacle exists when the difference image between the second viewpoint predicted image and the second viewpoint image contains a concatenated region including pixels in a predetermined number or more. This enables to determine the presence of an obstacle while suppressing the influence of noise in the difference image.

The exemplary embodiment and detailed example of the present invention have been described above. However, the present invention is not limited to the exemplary embodiment and detailed example. The above-described exemplary embodiment and detailed example may be changed in form or on specifics without departing from the spirit and scope of the present invention defined in the appended claims.

INDUSTRIAL APPLICABILITY

The present invention is applicable to, e.g., an obstacle detection system aiming at supporting parking a motor vehicle or determining the moving direction of a robot.

The invention claimed is:

1. A moving amount calculation system, comprising:
    a camera which is mounted on a moving body and senses an image at a first viewpoint and at a second viewpoint, different from the first viewpoint, as the moving body moves;
    a moving data measurement unit which measures a moving amount of the moving body from the first viewpoint to the second viewpoint; and
    an arithmetic device which updates, in accordance with the image sensed by said camera, the moving amount measured by said moving data measurement unit, said arithmetic device comprising:
        a predicted image generation unit which generates a second viewpoint predicted image as a predicted image at the second viewpoint based on a first viewpoint image as an image sensed at the first viewpoint by said camera and the moving amount measured by said moving data measurement unit;
        an evaluation value calculation unit which calculates an evaluation value representing a coincidence between the second viewpoint predicted image generated by said predicted image generation unit and a second viewpoint image as an image sensed at the second viewpoint by said camera; and
        a moving amount updating unit which updates the moving amount based on the evaluation value calculated by said evaluation value calculation unit, the moving amount including a horizontal component moving amount which is, out of the moving amount measured by said moving data measurement unit, a component on a plane of movement of the moving body in a direction perpendicular to a moving direction of the moving body that moves straight ahead.

2. A moving amount calculation system according to claim 1, wherein said evaluation value calculation unit comprises a difference image generation unit which generates a difference image between the second viewpoint predicted image and the second viewpoint image, and calculates the evaluation value by dividing a sum of pixel values of pixels in a predetermined region of the difference image by a number of pixels in the region.

3. A moving amount calculation system according to claim 1, wherein said moving amount updating unit changes the horizontal component moving amount by a predetermined variation amount, generates, based on the first viewpoint image and the changed horizontal component moving amount, a horizontal minute variation predicted image as a predicted image upon changing the horizontal component moving amount by the variation amount, generates a difference image between the horizontal minute variation predicted image and the second viewpoint image, calculates an evaluation value representing a coincidence between the horizontal minute variation predicted image and the second viewpoint image, and calculates the horizontal component moving amount based on the variation amount and the evaluation value.

4. An obstacle detection system, comprising:
    a camera which is mounted on a moving body and senses an image at a first viewpoint and at a second viewpoint, different from the first viewpoint, as the moving body moves;
    a moving data measurement unit which measures a moving amount of the moving body from the first viewpoint to the second viewpoint; and
    an arithmetic device which determines, in accordance with the image sensed by said camera, whether an obstacle exists, said arithmetic device comprising:
        a predicted image generation unit which generates a second viewpoint predicted image as a predicted image at the second viewpoint based on a first viewpoint image as an image sensed at the first viewpoint by said camera and the moving amount measured by said moving data measurement unit;
        an evaluation value calculation unit which calculates a first evaluation value representing a coincidence between the second viewpoint predicted image generated by said predicted image generation unit and a second viewpoint image as an image sensed at the second viewpoint by said camera;
        a moving amount updating unit which updates the moving amount based on the first evaluation value calculated by said evaluation value calculation unit, the moving amount including a horizontal component moving amount which is, out of the moving amount measured by said moving data measurement unit, a component on a plane of movement of the moving body in a direction perpendicular to a moving direction of the moving body that moves straight ahead; and
        an obstacle detection unit which determines, based on the second viewpoint predicted image generated by said predicted image generation unit and the second viewpoint image sensed at the second viewpoint by said camera, whether an obstacle exists.

5. An obstacle detection system according to claim 4, wherein said evaluation value calculation unit comprises a difference image generation unit which generates a difference image between the second viewpoint predicted image and the second viewpoint image and calculates the first evaluation value by dividing a sum of pixel values of pixels in a predetermined region of the difference image by a number of pixels in the region.

6. An obstacle detection system according to claim 4, wherein said moving amount updating unit changes the horizontal component moving amount by a predetermined variation amount, generates, based on the first viewpoint image and the changed horizontal component moving amount, a horizontal minute variation predicted image as a predicted image upon changing the horizontal component moving amount by the variation amount, generates a difference image between the horizontal minute variation predicted image and the second viewpoint image, calculates a second evaluation value representing a coincidence between the horizontal minute variation predicted image and the second viewpoint image, and calculates the horizontal component moving amount based on the second evaluation value.

7. An obstacle detection system according to claim 6, wherein said moving amount updating unit calculates the horizontal component moving amount based on the variation amount and the second evaluation value.

8. An obstacle detection system according to claim 6, wherein said moving amount updating unit calculates the horizontal component moving amount by adding a value based on a difference between the first evaluation value and the second evaluation value to the horizontal component moving amount before the change.

9. An obstacle detection system according to claim 4, wherein said predicted image generation unit generates the second viewpoint predicted image based on not the moving amount measured by said moving data measurement unit but the moving amount updated by said moving amount updating unit.

10. An obstacle detection system according to claim 9, wherein said predicted image generation unit, said evaluation value calculation unit, and said moving amount updating unit repeatedly execute a processing based on the updated moving amount, and
wherein said obstacle detection unit performs a determination based on a second viewpoint predicted image generated by a preceding processing if the processing is repeatedly performed until the current first evaluation value is not less than a preceding value, and performs the determination based on a second viewpoint predicted image generated by final processing if the processing is repeatedly performed a predetermined number of times.

11. An obstacle detection system according to claim 4, wherein said obstacle detection unit determines that an obstacle exists when the difference image between the second viewpoint predicted image and the second viewpoint image contains a concatenated region including pixels in not less than a predetermined number.

12. A moving amount calculation method, comprising:
causing a camera mounted on a moving body to sense an image at a first viewpoint and causing the camera to sense an image at a second viewpoint different from the first viewpoint after a movement of the moving body;
measuring a moving amount of the moving body from the first viewpoint to the second viewpoint;
generating a second viewpoint predicted image as a predicted image at the second viewpoint based on the measured moving amount and a first viewpoint image as an image sensed at the first viewpoint;
calculating an evaluation value representing a coincidence between the second viewpoint predicted image and a second viewpoint image as an image sensed at the second viewpoint; and
updating the moving amount based on the evaluation value, the moving amount including a horizontal component moving amount which is, out of the measured moving amount, a component on a plane of movement of the moving body in a direction perpendicular to a moving direction of the moving body that moves straight ahead.

13. A moving amount calculation method according to claim 12,
wherein the calculating the evaluation value comprises:
generating a difference image between the second viewpoint predicted image and the second viewpoint image; and
calculating the evaluation value by dividing a sum of pixel values of pixels in a predetermined region of the difference image by a number of pixels in the region.

14. A moving amount calculation method according to claim 12, wherein the updating the moving amount comprises:
changing the horizontal component moving amount by a predetermined variation amount;
generating, based on the first viewpoint image and the changed horizontal component moving amount, a horizontal minute variation predicted image as a predicted image upon changing the horizontal component moving amount by the variation amount;
generating a difference image between the horizontal minute variation predicted image and the second viewpoint image and calculating an evaluation value representing a coincidence between the horizontal minute variation predicted image and the second viewpoint image; and
calculating the horizontal component moving amount based on the variation amount and the evaluation value.

15. An obstacle detection method, said method comprising:
causing a camera mounted on a moving body to sense an image at a first viewpoint and causing the camera to sense an image at a second viewpoint different from the first viewpoint after a movement of the moving body;
measuring a moving amount of the moving body from the first viewpoint to the second viewpoint;
generating a second viewpoint predicted image as a predicted image at the second viewpoint based on the measured moving amount and a first viewpoint image as an image sensed at the first viewpoint;
calculating a first evaluation value representing a coincidence between the second viewpoint predicted image and a second viewpoint image as an image sensed at the second viewpoint;
updating the moving amount based on the first evaluation value, the moving amount including a horizontal component moving amount which is, out of the measured moving amount, a component on a plane of movement of the moving body in a direction perpendicular to a moving direction of the moving body that moves straight ahead; and
determining, based on the second viewpoint predicted image and the second viewpoint image, whether an obstacle exists.

16. An obstacle detection method according to claim 15, wherein the calculating the first evaluation value comprises:
generating a difference image between the second viewpoint predicted image and the second viewpoint image; and
calculating the first evaluation value by dividing a sum of pixel values of pixels in a predetermined region of the difference image by a number of pixels in the region.

17. An obstacle detection method according to claim 15, wherein the updating the moving amount comprises:
- changing the horizontal component moving amount by a predetermined variation amount;
- generating, based on the first viewpoint image and the changed horizontal component moving amount, a horizontal minute variation predicted image as a predicted image upon changing the horizontal component moving amount by the variation amount;
- generating a difference image between the horizontal minute variation predicted image and the second viewpoint image and calculating a second evaluation value representing a coincidence between the horizontal minute variation predicted image and the second viewpoint image; and
- calculating the horizontal component moving amount based on the second evaluation value.

18. An obstacle detection method according to claim 17, wherein the calculating the horizontal component moving amount comprises calculating the horizontal component moving amount based on the variation amount and the second evaluation value.

19. An obstacle detection method according to claim 17, wherein the calculating the horizontal component moving amount comprises calculating the horizontal component moving amount by adding a value based on a difference between the first evaluation value and the second evaluation value to the horizontal component moving amount before the change.

20. An obstacle detection method according to claim 15, further comprising:
- generating a second viewpoint predicted image again, based on the first viewpoint image and the updated moving amount;
- calculating the first evaluation value representing the coincidence between the second viewpoint image and the second viewpoint predicted image, based on the updated moving amount again; and
- updating the moving amount again based on the first evaluation value based on the updated moving amount.

21. An obstacle detection method according to claim 20, further comprising determining whether the current first evaluation value is not less than a preceding value when a series of processes including the moving amount updating, the second viewpoint predicted image generation, and the first evaluation value calculation is repeatedly performed,
- wherein the determining whether an obstacle exists comprises, when it is determined that the current first evaluation value is not less than the preceding value, performing a determination based on a second viewpoint predicted image generated by a preceding processing.

22. An obstacle detection method according to claim 20, further comprising determining whether the moving amount has been updated a predetermined number of times,
- wherein the determining whether an obstacle exists comprises, when it is determined that the moving amount has been updated a predetermined number of times, performing a determination based on a second viewpoint predicted image generated by a final processing.

23. An obstacle detection method according to claim 15, wherein the determining whether an obstacle exists comprises determining that an obstacle exists when the difference image between the second viewpoint predicted image and the second viewpoint image contains a concatenated region including pixels in not less than a predetermined number.

24. A non-transitory computer readable storage medium tangibly embodying a program of machine-readable instructions executable by a digital processing apparatus to perform a method, said method comprising:
- generating a second viewpoint predicted image as a predicted image at a second viewpoint based on a first viewpoint image as an image sensed at a first viewpoint by a camera mounted on a moving body and a moving amount of the moving body from the first viewpoint to the second viewpoint;
- calculating an evaluation value representing a coincidence between the second viewpoint predicted image and a second viewpoint image as an image sensed at the second viewpoint by the camera; and
- updating the moving amount based on the evaluation value, the moving amount including a horizontal component moving amount which is, out of the moving amount of the moving body, a component on a plane of movement of the moving body in a direction perpendicular to a moving direction of the moving body that moves straight ahead.

25. A storage medium according to claim 24, wherein the calculating the evaluation value further comprises:
- generating a difference image between the second viewpoint predicted image and the second viewpoint image; and
- calculating the evaluation value by dividing a sum of pixel values of pixels in a predetermined region of the difference image by a number of pixels in the region.

26. A storage medium according to claim 24, wherein the step of the updating the moving amount further comprises:
- changing the horizontal component moving amount by a predetermined variation amount;
- generating, based on the first viewpoint image and the changed horizontal component moving amount, a horizontal minute variation predicted image as a predicted image upon changing the horizontal component moving amount by the variation amount;
- generating a difference image between the horizontal minute variation predicted image and the second viewpoint image and calculating an evaluation value representing coincidence between the horizontal minute variation predicted image and the second viewpoint image; and
- calculating the horizontal component moving amount based on the variation amount and the evaluation value.

27. A non-transitory computer readable storage medium tangibly embodying a program of machine-readable instructions executable by a digital processing apparatus to perform a method, said method comprising:
- generating a second viewpoint predicted image as a predicted image at a second viewpoint based on a first viewpoint image as an image sensed at a first viewpoint by a camera mounted on a moving body and a moving amount of the moving body from the first viewpoint to the second viewpoint;
- calculating a first evaluation value representing a coincidence between the second viewpoint predicted image and a second viewpoint image as an image sensed at the second viewpoint by the camera;
- updating the moving amount based on the first evaluation value, the moving amount including a horizontal component moving amount which is, out of the moving amount of the moving body, a component on a plane of movement of the moving body in a direction perpendicular to a moving direction of the moving body that moves straight ahead; and determining, based on the second viewpoint predicted image and the second viewpoint image, whether an obstacle exists.

28. A storage medium according to claim 27, wherein the calculating the evaluation value further comprises:
   generating a difference image between the second viewpoint predicted image and the second viewpoint image; and
   calculating the first evaluation value by dividing a sum of pixel values of pixels in a predetermined region of the difference image by a number of pixels in the region.

29. A storage medium according to claim 27, wherein the step of the updating the moving amount further comprising:
   changing the horizontal component moving amount by a predetermined variation amount;
   generating, based on the first viewpoint image and the changed horizontal component moving amount, a horizontal minute variation predicted image as a predicted image upon changing the horizontal component moving amount by the variation amount;
   generating a difference image between the horizontal minute variation predicted image and the second viewpoint image and calculating a second evaluation value representing a coincidence between the horizontal minute variation predicted image and the second viewpoint image; and
   calculating the horizontal component moving amount based on the second evaluation value.

30. A storage medium according to claim 29, wherein the calculating the horizontal component moving amount further comprises calculating the horizontal component moving amount based on the variation amount and the second evaluation value.

31. A storage medium according to claim 29, wherein the calculating the horizontal component moving amount further comprises calculating the horizontal component moving amount by adding a value based on a difference between the first evaluation value and the second evaluation value to the horizontal component moving amount before the change.

32. A storage medium according to claim 27, further comprising generating a second viewpoint predicted image again based on the first viewpoint image and the updated moving amount;
   calculating the first evaluation value representing the coincidence between the second viewpoint image and the second viewpoint predicted image based on the updated moving amount again; and
   updating the moving amount again based on the first evaluation value based on the updated moving amount.

33. A storage medium according to claim 32, further comprising determining whether the current first evaluation value is not less than a preceding value when a series of processes including the moving amount updating, the second viewpoint predicted image generation, and the first evaluation value calculation is repeatedly performed, and in the determining whether an obstacle exists, the computer is caused to execute, when it is determined that the current first evaluation value is not less than the preceding value, performing the determination based on a second viewpoint predicted image generated by a preceding processing.

34. A storage medium according to claim 32, further comprising determining whether the moving amount has been updated a predetermined number of times, and
   wherein the determining whether an obstacle exists further comprises, when it is determined that the moving amount has been updated a predetermined number of times, performing determination based on a second viewpoint predicted image generated by a final processing.

35. A storage medium according to claim 27, wherein the determining whether an obstacle exists further comprises determining that an obstacle exists when the difference image between the second viewpoint predicted image and the second viewpoint image contains a concatenated region including pixels in not less than a predetermined number.

* * * * *